US012301666B2

(12) United States Patent
Paris et al.

(10) Patent No.: US 12,301,666 B2
(45) Date of Patent: May 13, 2025

(54) METHOD, APPARATUS AND COMPUTER PROGRAM PRODUCT PROVIDING QUALITY OF SERVICE MANAGEMENT FOR EXTENDED REALITY APPLICATIONS

(71) Applicant: Nokia Technologies Oy, Espoo (FI)

(72) Inventors: Stefano Paris, Massy (FR); Panagiotis Spapis, Munich (DE); Rastin Pries, Munich (DE); Devaki Chandramouli, Dallas, TX (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/546,675

(22) PCT Filed: Jan. 28, 2022

(86) PCT No.: PCT/EP2022/051975
§ 371 (c)(1),
(2) Date: Aug. 16, 2023

(87) PCT Pub. No.: WO2022/175056
PCT Pub. Date: Aug. 25, 2022

(65) Prior Publication Data
US 2024/0137419 A1 Apr. 25, 2024
US 2024/0236190 A9 Jul. 11, 2024

Related U.S. Application Data

(60) Provisional application No. 63/150,343, filed on Feb. 17, 2021.

(51) Int. Cl.
*H04L 67/131* (2022.01)
*G06F 3/01* (2006.01)
(Continued)

(52) U.S. Cl.
CPC .......... *H04L 67/131* (2022.05); *H04L 67/141* (2013.01); *H04L 67/61* (2022.05); *G06F 3/012* (2013.01)

(58) Field of Classification Search
CPC ..... H04L 67/131; H04L 67/61; H04L 67/141; G06F 3/012
See application file for complete search history.

(56) References Cited

U.S. PATENT DOCUMENTS 7,310,301 B1 * 12/2007 Kleider ................. H04L 5/0044
370/480
10,565,773 B1 * 2/2020 Tytgat ................... G06T 15/005
(Continued)

*Primary Examiner* — William G Trost, IV
*Assistant Examiner* — Abdelbasst Talioua
(74) *Attorney, Agent, or Firm* — Barta Jones, PLLC

(57) ABSTRACT

A method, apparatus, and computer program product provide for providing quality of service management during immersive content consumption. In the context of a method, the method includes receiving a first request comprising a positioning error set. The method also includes determining, based at least on the first request, an enhanced quality of service (QOS) indicator representing a QoS for a client device associated with the positioning error set. The method also includes causing transmission of a first response comprising configuration data related to a QoS flow for the client device, the configuration data being based at least on the enhanced QoS indicator.

12 Claims, 20 Drawing Sheets

(51) Int. Cl.
*H04L 67/141* (2022.01)
*H04L 67/61* (2022.01)

(56) References Cited

U.S. PATENT DOCUMENTS

| | | | |
|---|---|---|---|
| 2014/0184475 A1* | 7/2014 | Tantos | H04N 21/234318 |
| | | | 345/8 |
| 2018/0070113 A1* | 3/2018 | Phillips | H04N 21/6405 |
| 2018/0270531 A1* | 9/2018 | Ye | H04L 43/16 |
| 2018/0352018 A1* | 12/2018 | Mate | G11B 27/00 |
| 2018/0359189 A1* | 12/2018 | Ye | H04N 23/698 |
| 2019/0313289 A1* | 10/2019 | Huang-Fu | H04L 47/2491 |
| 2020/0037029 A1* | 1/2020 | He | H04L 65/612 |
| 2020/0145729 A1* | 5/2020 | Liu | H04L 65/612 |
| 2021/0037250 A1* | 2/2021 | Makar | H04N 19/107 |
| 2021/0089055 A1* | 3/2021 | Tran | G06N 3/08 |
| 2021/0304706 A1* | 9/2021 | Petrangeli | G06F 16/487 |
| 2023/0199550 A1* | 6/2023 | Xing | H04W 28/0257 |
| | | | 370/329 |
| 2023/0319514 A1* | 10/2023 | Kim | H04W 4/08 |
| | | | 370/312 |
| 2024/0037833 A1* | 2/2024 | Chandramouli | H04N 21/4728 |

* cited by examiner

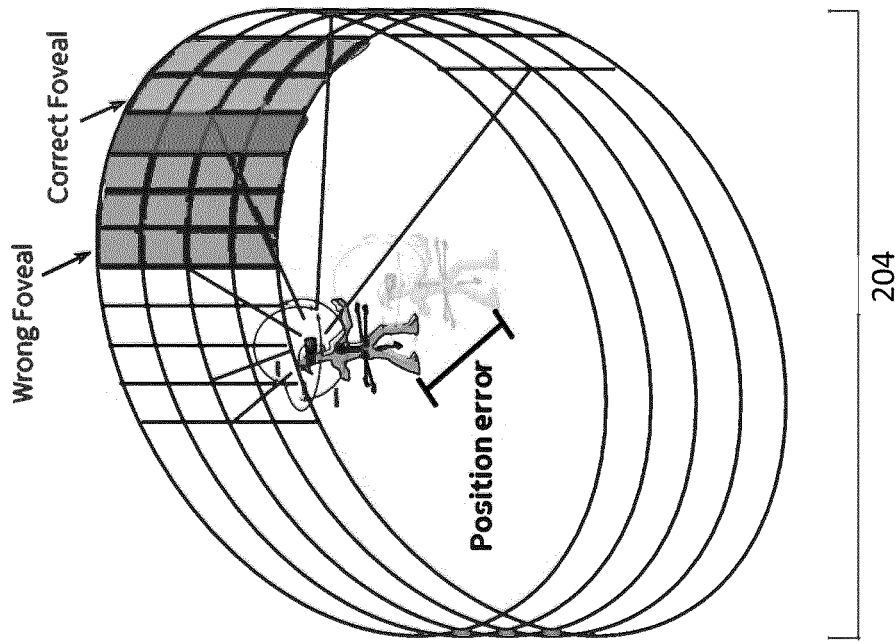
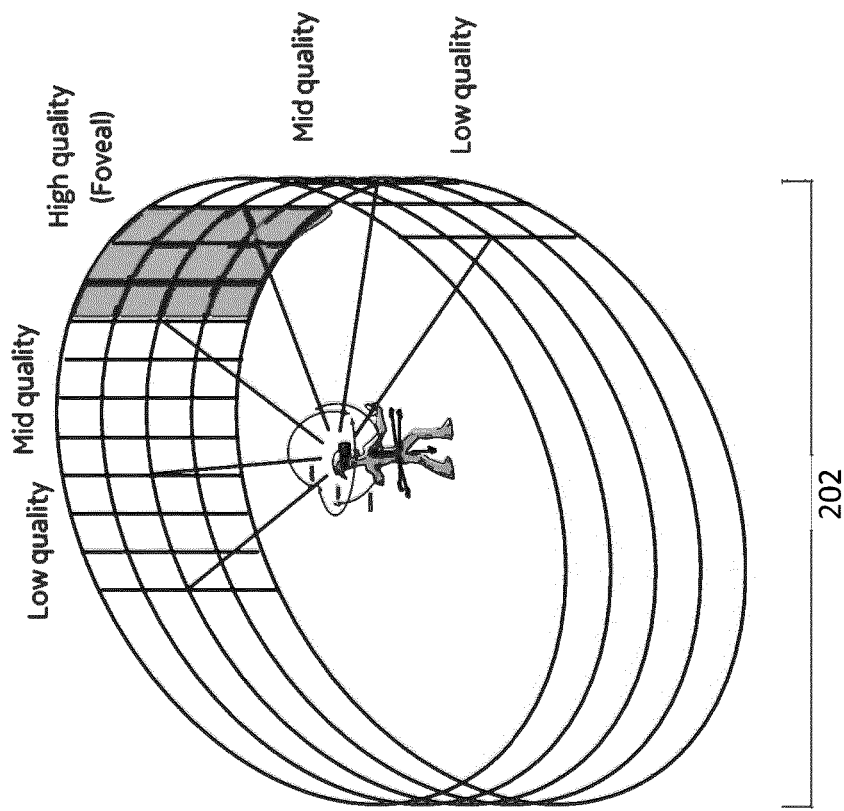
FIG. 2

| enhanced QoS Indicator Value | Resource Type | Default Priority Level | Packet Delay Budget | Packet Error Rate | Default Maximum Data Burst Volume | Default Averaging Window | Max 6DoF Error | Example Services |
|---|---|---|---|---|---|---|---|---|
| 80 | Non-GBR | 68 | 10 ms (NOTE 5, NOTE 10) | $10^{-6}$ | N/A | N/A | (0, 0, 0) (0, 0, 0) | Low Latency eMBB applications Augmented Reality |
| : | : | : | : | : | : | : | : | : |
| 100 | Non-GBR | 68 | 10 ms (NOTE 5, NOTE 10) | $10^{-6}$ | N/A | N/A | (0.1, 0.1, 0.1) (5°, 5°, 5°) | Low Latency eMBB applications Augmented Reality with Error |

FIG. 9

METHOD, APPARATUS AND COMPUTER PROGRAM PRODUCT PROVIDING QUALITY OF SERVICE MANAGEMENT FOR EXTENDED REALITY APPLICATIONS

CROSS REFERENCE TO RELATED APPLICATIONS

This application is a national stage application, filed under 35 U.S.C. § 371, of International Patent Application No PCT/EP2022/051975, filed on Jan. 28, 2022, which claims the benefit of U.S. Provisional Application No. 63/150,343, filed Feb. 17, 2021. The entire contents of all of the above applications are incorporated herein by reference.

TECHNOLOGICAL FIELD

An example embodiment relates generally to immersive content consumption, and, more particularly, to techniques for providing quality of service management during immersive content consumption.

BACKGROUND

An increasing amount of video content is captured and delivered for a variety of different applications. For example, video content may be delivered via streaming, such as for Extended Reality (XR) services, such as Virtual Reality (VR) applications, Augmented Reality (AR) applications, and/or other types of applications. The video content that is captured and delivered may be expansive and may provide a panoramic view. In this regard, a streaming service may offer multiple representations of the same subpicture or tile by storing tiles at different qualities by varying video parameters like resolution, compression, and/or framerate. The download of new XR content can be triggered by head and user movements, and/or the need to download a subsequent portion of a three-dimensional (3D) video. Once all tiles in the FoV are downloaded, they can be rendered to generate the 3D representation that is displayed to the user.

Viewport-dependent streaming for XR services is typically implemented based on adaptive streaming schemes which can be based on network status, pose, and/or Six Degrees of Freedom (6DoF) information to adjust the quality to the available bitrate and user field of view (FoV). However, errors in the positions and angles can occur. While these errors can be corrected by the XR application assuming that sufficient information has been transmitted by the server, the server must transmit a large amount of high-quality information to compensate the errors and thus, the efficiency of the bitrate adaptation algorithm is negatively affected by the magnitude of the errors. In some cases, a wrong representation of a 3D image and/or video can be corrected at the receiver. For example, small rotational errors can be corrected by Asynchronous Time Warp (ATW), which transforms pre-rendered images stored in the buffer based on the very latest pose/6DoF tracking information before displaying the corrected image to the user. However, ATW cannot compensate position errors or large rotational errors without seriously affecting the user's Quality of Experience (QoE). This requires the transmission of tiles with higher quality. The amount of extra-information that must be transmitted to compensate position and angle errors depends on the magnitude of the error. Therefore, there exists a relationship between the magnitude of 6DoF errors and the extra bandwidth needed to compensate such errors.

BRIEF SUMMARY

A method, apparatus, and computer program product are disclosed for providing quality of service management during immersive content consumption. In one embodiment, the method, apparatus and computer program product are configured to determine and cause transmission of enhanced QoS information to provide a guaranteed bitrate for a client device. In this regard, user position and rotation and errors in the position and angles of rotation are utilized for determination as to the treatment of a flow of packets generated by, for example, XR and Cloud Gaming (CG) applications. By incorporating error information into the determination of QoS information, a more accurate reservation and scheduling of network and radio resources is achieved, leading to reduced consumption of network bandwidth and processing resources.

In an embodiment, a method is provided. The method includes receiving a first request comprising a positioning error set. The method also includes determining, based at least on the first request, an enhanced quality of service (QoS) indicator representing a QoS for a client device associated with the positioning error set. The method also includes causing transmission of a first response comprising configuration data related to a QoS flow for the client device, the configuration data being based at least on the enhanced QoS indicator.

In some embodiments of the method, the first request comprising the positioning error set is received from the client device or a network function associated with the client device.

In some embodiments of the method, determining the enhanced QoS indicator further comprises determining one or more of a bandwidth, a guaranteed bit rate (GBR), a maximum bit rate (MBR), and one or more QoS characteristics for the client device based at least on the positioning error set.

In some embodiments of the method, the configuration data related to the QoS flow comprises one or more of one or more QoS rules and one or more QoS parameters for the QoS flow. In some embodiments of the method, the first request comprises a PDU session create request or a PDU session update request. In some embodiments of the method, the first response comprises a PDU session create response or a PDU session update response.

In some embodiments of the method, determining the enhanced QoS indicator includes determining a maximum displacement value and an angle of rotation value based at least on the positioning error set. In some embodiments of the method, determining the enhanced QoS indicator also includes applying a transformation to the maximum displacement value and the angle of rotation value to determine a first field of view representation. In some embodiments of the method, determining the enhanced QoS indicator also includes generating a point list by applying a plurality of displacements to a second field of view representation. In some embodiments of the method, determining the enhanced QoS indicator also includes, based at least on the point list, determining a volume of a convex hull of points in the point list. In some embodiments of the method, determining the enhanced QoS indicator also includes determining an information ratio based at least on a volume of the first field of view representation and the volume of the convex hull. In some embodiments of the method, determining the enhanced QoS indicator also includes determining a guaranteed bitrate based at least on the information ratio.

In another embodiment, an apparatus is provided. The apparatus includes at least one processor and at least one memory including computer program code, the at least one memory and the computer program code configured to, with the at least one processor, cause the apparatus to receive a first request comprising a positioning error set. The at least one memory and the computer program code are also configured to, with the at least one processor, cause the apparatus to determine, based at least on the first request, an enhanced quality of service (QoS) indicator representing a QoS for a client device associated with the positioning error set. The at least one memory and the computer program code are also configured to, with the at least one processor, cause the apparatus to cause transmission of a first response comprising configuration data related to a QoS flow for the client device, the configuration data being based at least on the enhanced QoS indicator.

In some embodiments of the apparatus, the first request comprising the positioning error set is received from the client device or a network function associated with the client device. In some embodiments of the apparatus, the at least one memory and the computer program code configured to determine the enhanced QoS indicator are further configured to with the at least one processor, cause the apparatus to determine one or more of a bandwidth, a guaranteed bit rate (GBR), a maximum bit rate (MBR), and one or more QoS characteristics for the client device based at least on the positioning error set.

In some embodiments of the apparatus, the configuration data related to the QoS flow comprises one or more of one or more QoS rules and one or more QoS parameters for the QoS flow. In some embodiments of the apparatus, the first request comprises a PDU session create request or a PDU session update request. In some embodiments of the apparatus, the first response comprises a PDU session create response or a PDU session update response.

In some embodiments of the apparatus, the at least one memory and the computer program code configured to, with the at least one processor, cause the apparatus to determine the enhanced QoS indicator are further configured to, with the at least one processor, cause the apparatus to determine a maximum displacement value and an angle of rotation value based at least on the positioning error set. In some embodiments of the apparatus, the at least one memory and the computer program code configured to, with the at least one processor, cause the apparatus to determine the enhanced QoS indicator are further configured to, with the at least one processor, cause the apparatus to apply a transformation to the maximum displacement value and the angle of rotation value to determine a first field of view representation. In some embodiments of the apparatus, the at least one memory and the computer program code configured to, with the at least one processor, cause the apparatus to determine the enhanced QoS indicator are further configured to, with the at least one processor, cause the apparatus to generate a point list by applying a plurality of displacements to a second field of view representation.

In some embodiments of the apparatus, the at least one memory and the computer program code configured to, with the at least one processor, cause the apparatus to determine the enhanced QoS indicator are further configured to, with the at least one processor, cause the apparatus to, based at least on the point list, determine a volume of a convex hull of points in the point list. In some embodiments of the apparatus, the at least one memory and the computer program code configured to, with the at least one processor, cause the apparatus to determine the enhanced QoS indicator are further configured to, with the at least one processor, cause the apparatus to determine an information ratio based at least on a volume of the first field of view representation and the volume of the convex hull. In some embodiments of the apparatus, the at least one memory and the computer program code configured to, with the at least one processor, cause the apparatus to determine the enhanced QoS indicator are further configured to, with the at least one processor, cause the apparatus to determine a guaranteed bitrate based at least on the information ratio.

In another embodiment, a computer program product is provided that includes a non-transitory computer readable storage medium having program code portions stored thereon, with the program code portions configured, upon execution, to receive a first request comprising a positioning error set The program code portions are also configured, upon execution, to determine, based at least on the first request, an enhanced quality of service (QoS) indicator representing a QoS for a client device associated with the positioning error set. The program code portions are also configured, upon execution, to cause transmission of a first response comprising configuration data related to a QoS flow for the client device, the configuration data being based at least on the enhanced QoS indicator.

In some embodiments of the computer program product, the first request comprising the positioning error set is received from the client device or a network function associated with the client device.

In some embodiments of the computer program product, the program code portions configured, upon execution, to determine the enhanced QoS indicator are further configured to, upon execution, to determine one or more of a bandwidth, a guaranteed bit rate (GBR), a maximum bit rate (MBR), and one or more QoS characteristics for the client device based at least on the positioning error set.

In some embodiments of the computer program product, the configuration data related to the QoS flow comprises one or more of one or more QoS rules and one or more QoS parameters for the QoS flow. In some embodiments of the computer program product, the first request comprises a PDU session create request or a PDU session update request. In some embodiments of the computer program product, the first response comprises a PDU session create response or a PDU session update response.

In some embodiments of the computer program product, the program code portions configured, upon execution, to determine the enhanced QoS indicator are further configured to, upon execution, to determine a maximum displacement value and an angle of rotation value based at least on the positioning error set. In some embodiments of the computer program product, the program code portions configured, upon execution, to determine the enhanced QoS indicator are further configured to, upon execution, to apply a transformation to the maximum displacement value and the angle of rotation value to determine a first field of view representation. In some embodiments of the computer program product, the program code portions configured, upon execution, to determine the enhanced QoS indicator are further configured to, upon execution, to generate a point list by applying a plurality of displacements to a second field of view representation. In some embodiments of the computer program product, the program code portions configured, upon execution, to determine the enhanced QoS indicator are further configured to, upon execution, to, based at least on the point list, determine a volume of a convex hull of points in the point list. In some embodiments of the computer program product, the program code portions configured, upon execution, to determine the enhanced QoS indicator are further configured to, upon execution, to determine an information ratio based at least on a volume of the first field of view representation and the volume of the convex hull. In some embodiments of the computer program product, the program code portions configured, upon execution, to determine the enhanced QoS indicator are further configured to, upon execution, to determine a guaranteed bitrate based at least on the information ratio.

In another embodiment, an apparatus is provided that includes means for receiving a first request comprising a positioning error set. The apparatus also includes means for determining, based at least on the first request, an enhanced quality of service (QoS) indicator representing a QoS for a client device associated with the positioning error set. The apparatus also includes means for causing transmission of a first response comprising configuration data related to a QoS flow for the client device, the configuration data being based at least on the enhanced QoS indicator.

In some embodiments of the apparatus, the first request comprising the positioning error set is received from the client device or a network function associated with the client device.

In some embodiments of the apparatus, the means for determining the enhanced QoS indicator further comprise means for determining one or more of a bandwidth, a guaranteed bit rate (GBR), a maximum bit rate (MBR), and one or more QoS characteristics for the client device based at least on the positioning error set.

In some embodiments of the apparatus, the configuration data related to the QoS flow comprises one or more of one or more QoS rules and one or more QoS parameters for the QoS flow. In some embodiments of the apparatus, the first request comprises a PDU session create request or a PDU session update request. In some embodiments of the apparatus, the first response comprises a PDU session create response or a PDU session update response.

In some embodiments of the apparatus, the means for determining the enhanced QoS indicator comprises means for determining a maximum displacement value and an angle of rotation value based at least on the positioning error set. In some embodiments of the apparatus, the means for determining the enhanced QoS indicator comprises means for means for applying a transformation to the maximum displacement value and the angle of rotation value to determine a first field of view representation. In some embodiments of the apparatus, the means for determining the enhanced QoS indicator comprises means for means for generating a point list by applying a plurality of displacements to a second field of view representation. In some embodiments of the apparatus, the means for determining the enhanced QoS indicator comprises means for means for, based at least on the point list, determining a volume of a convex hull of points in the point list. In some embodiments of the apparatus, the means for determining the enhanced QoS indicator comprises means for means for determining an information ratio based at least on a volume of the first field of view representation and the volume of the convex hull. In some embodiments of the apparatus, the means for determining the enhanced QoS indicator comprises means for means for determining a guaranteed bitrate based at least on the information ratio.

In another embodiment, a method is provided. The method includes determining a positioning error set, the positioning error set comprising a plurality of values representing a position and rotation of a user. The method also includes causing transmission of a session request, the session request comprising the positioning error set, wherein causing transmission of the session request initiates a reservation of bandwidth for a client device based at least on the positioning error set.

In some embodiments of the method, determining the positioning error set and causing transmission of the session request is performed by the client device or a network function associated with the client device. In some embodiments of the method, the session request comprises a Packet Data Unit (PDU) Session Establishment Request or a PDU Session Modification Request. In some embodiments of the method, the positioning error set comprises a set of maximum deviations for coordinates defining the position and angles defining the rotation of the user.

In another embodiment, an apparatus is provided that includes at least one processor and at least one memory including computer program code, with the at least one memory and the computer program code configured to, with the at least one processor, cause the apparatus to determine a positioning error set, the positioning error set comprising a plurality of values representing a position and rotation of a user. The at least one memory and the computer program code are also configured to, with the at least one processor, cause the apparatus to cause transmission of a session request, the session request comprising the positioning error set, wherein causing transmission of the session request initiates a reservation of bandwidth for the client device based at least on the positioning error set.

In some embodiments of the apparatus, determining the positioning error set and causing transmission of the session request is performed by the client device or a network function associated with the client device. In some embodiments of the apparatus, the session request comprises a Packet Data Unit (PDU) Session Establishment Request or a PDU Session Modification Request. In some embodiments of the apparatus, the positioning error set comprises a set of maximum deviations for coordinates defining the position and angles defining the rotation of the user.

In another embodiment, a computer program product is provided that includes a non-transitory computer readable storage medium having program code portions stored thereon, the program code portions configured, upon execution, to determine a positioning error set, the positioning error set comprising a plurality of values representing a position and rotation of a user. The program code portions are also configured, upon execution, to cause transmission of a session request, the session request comprising the positioning error set, wherein causing transmission of the session request initiates a reservation of bandwidth for the client device based at least on the positioning error set.

In some embodiments of the computer program product, determining the positioning error set and causing transmission of the session request is performed by the client device or a network function associated with the client device. In some embodiments of the computer program product, the session request comprises a Packet Data Unit (PDU) Session Establishment Request or a PDU Session Modification Request.

In some embodiments of the computer program product, the positioning error set comprises a set of maximum deviations for coordinates defining the position and angles defining the rotation of the user.

In another embodiment, an apparatus is provided that includes means for determining a positioning error set, the positioning error set comprising a plurality of values representing a position and rotation of a user. The apparatus also includes means for causing transmission of a session request, the session request comprising the positioning error set, wherein causing transmission of the session request initiates a reservation of bandwidth for the client device based at least on the positioning error set.

In some embodiments of the apparatus, determining the positioning error set and causing transmission of the session request is performed by the client device or a network function associated with the client device. In some embodiments of the apparatus, the session request comprises a Packet Data Unit (PDU) Session Establishment Request or a PDU Session Modification Request. In some embodiments of the apparatus, the positioning error set comprises a set of maximum deviations for coordinates defining the position and angles defining the rotation of the user.

BRIEF DESCRIPTION OF THE DRAWINGS

Figure 1:
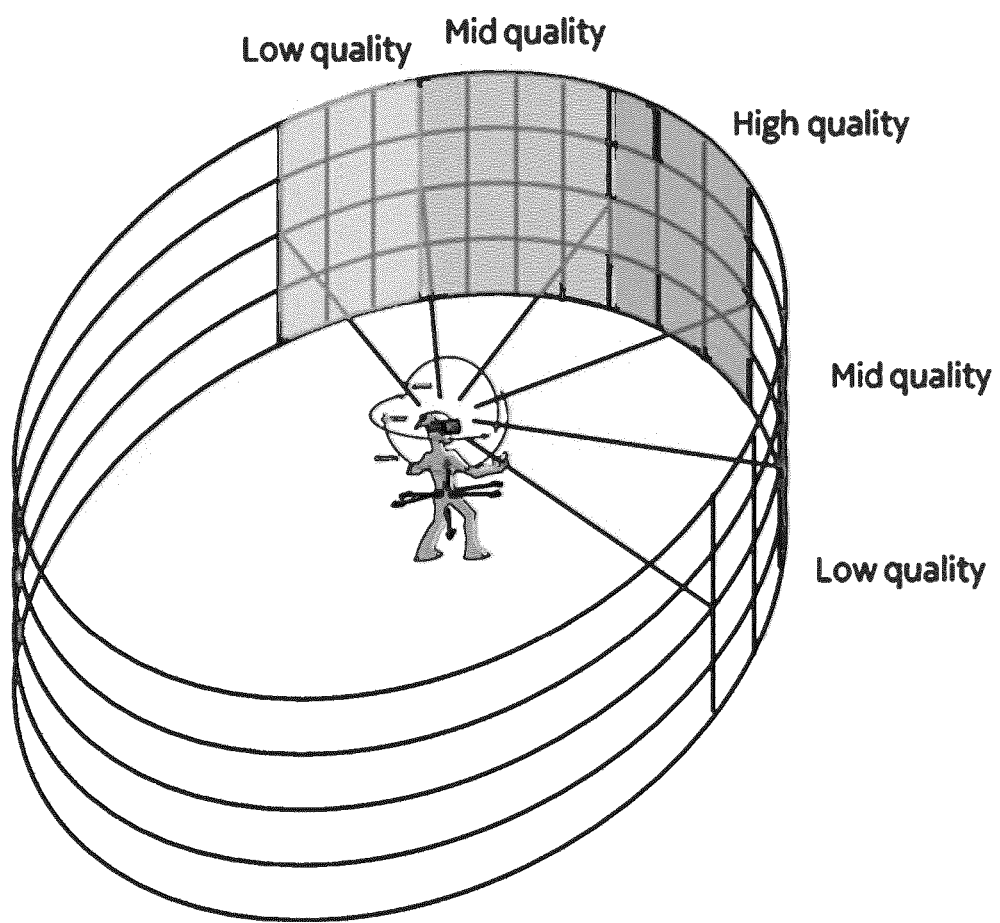
Figure 3:
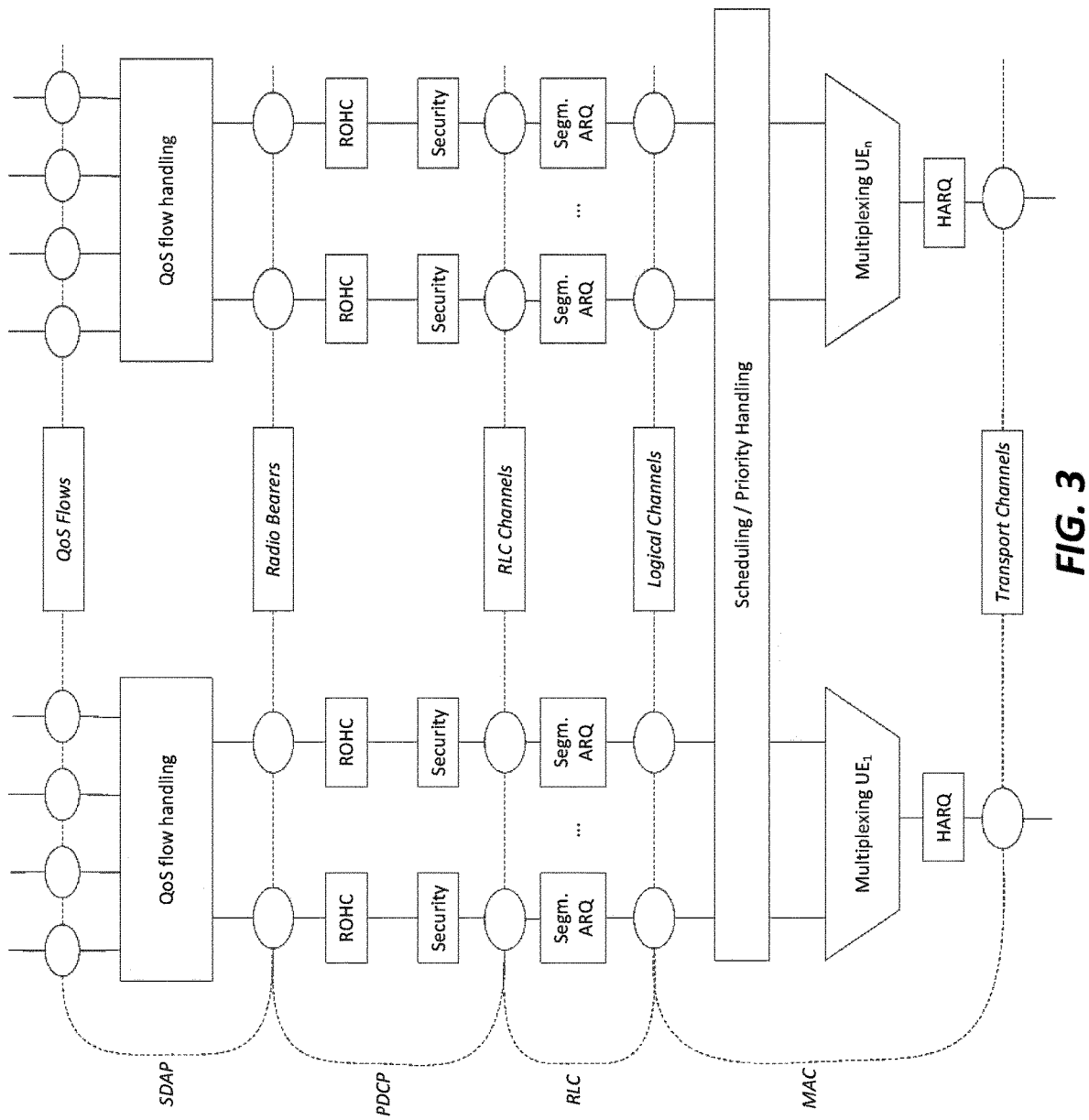
Figure 4:
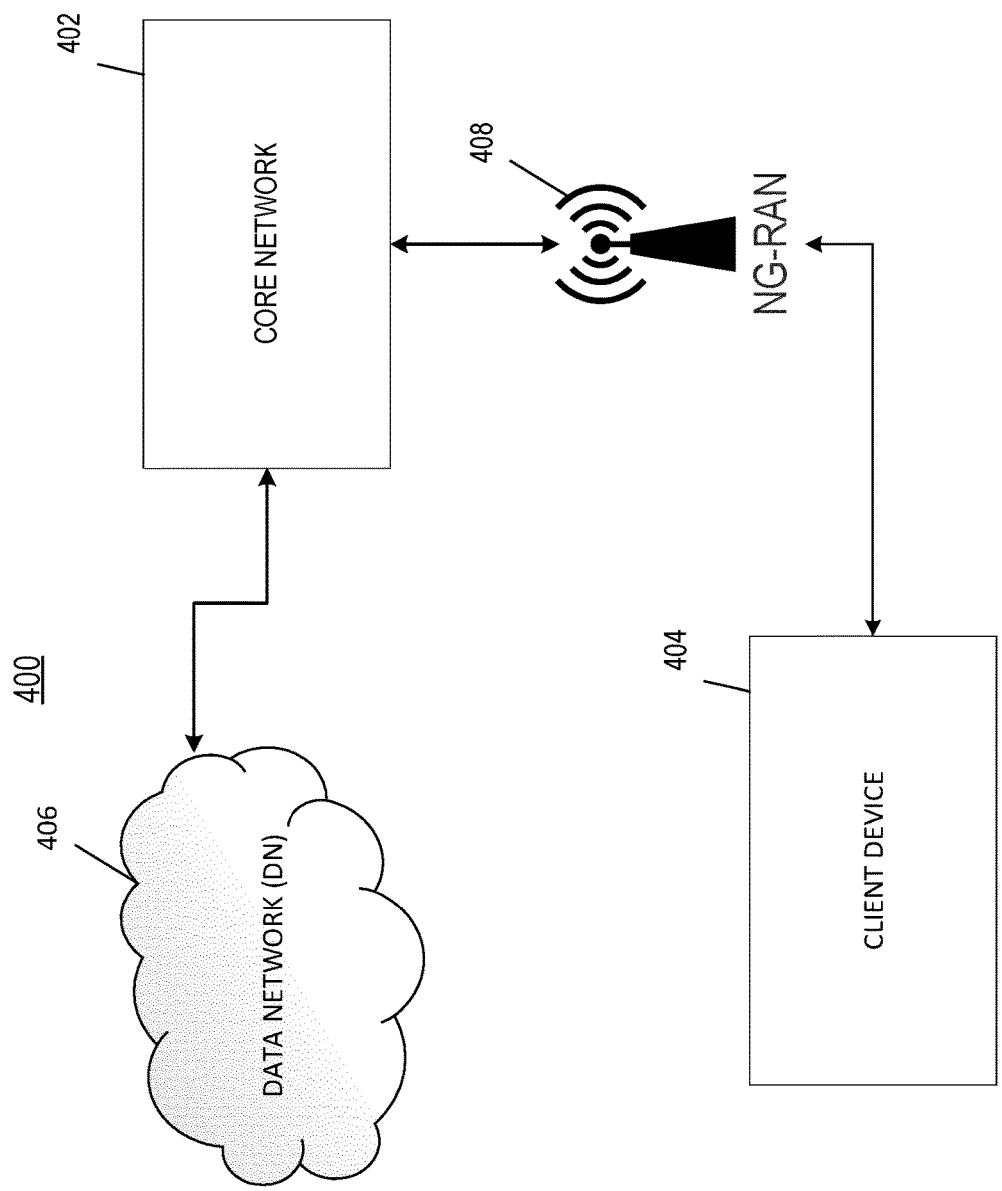
Figure 5:
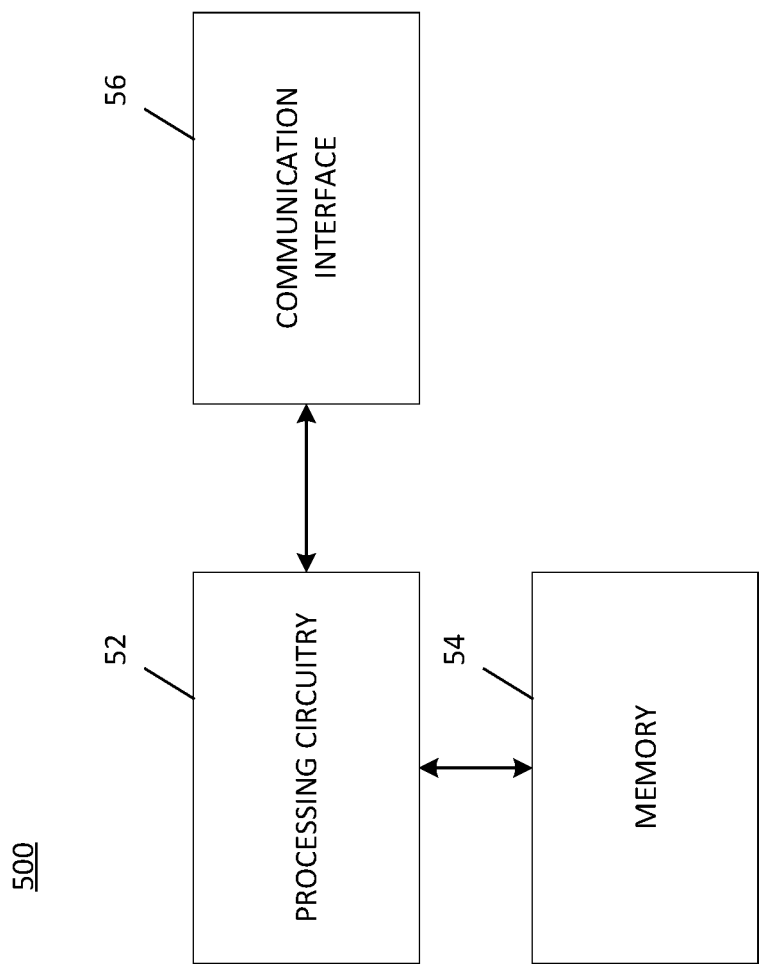
Figure 6:
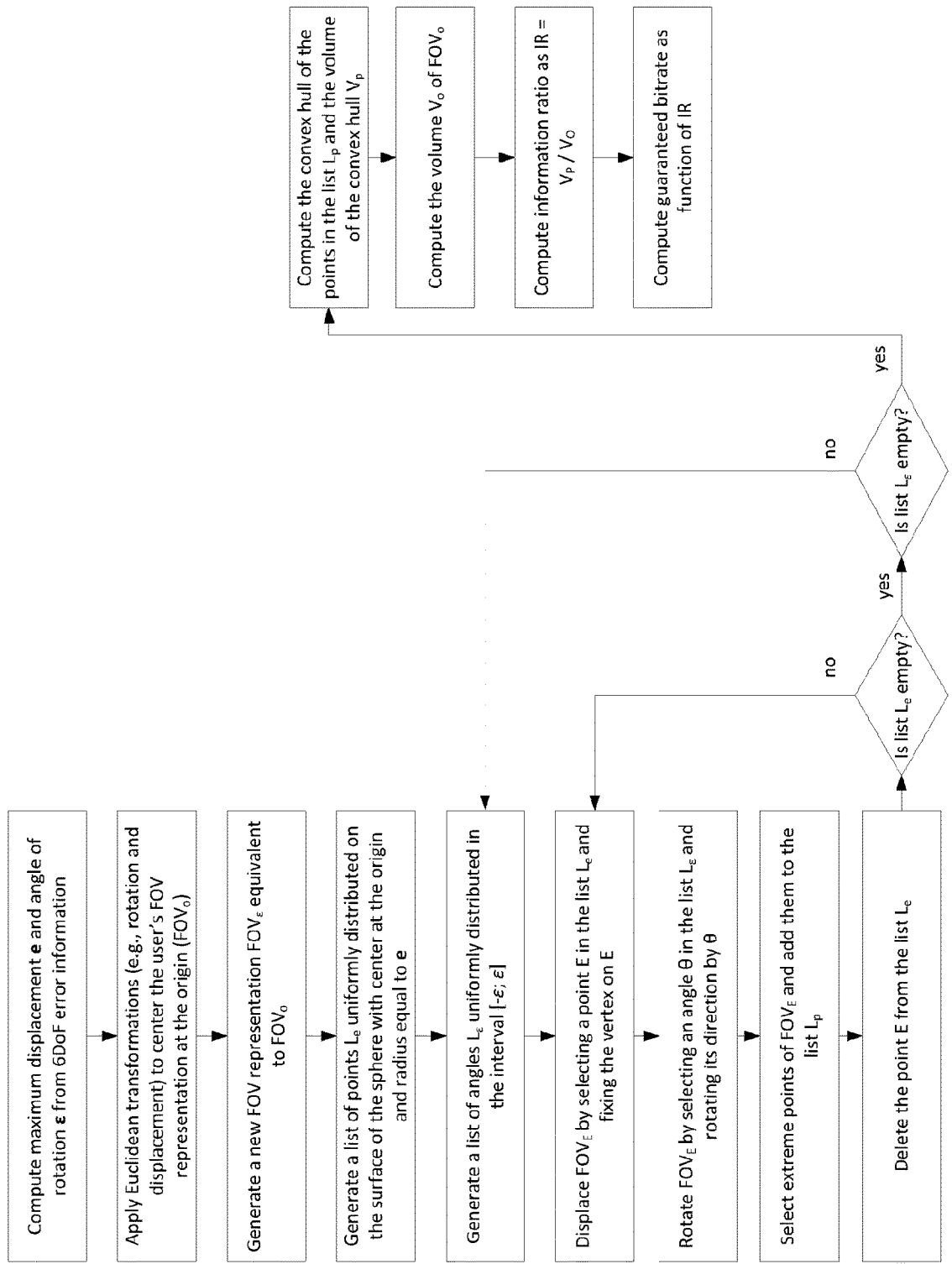
Figure 7:
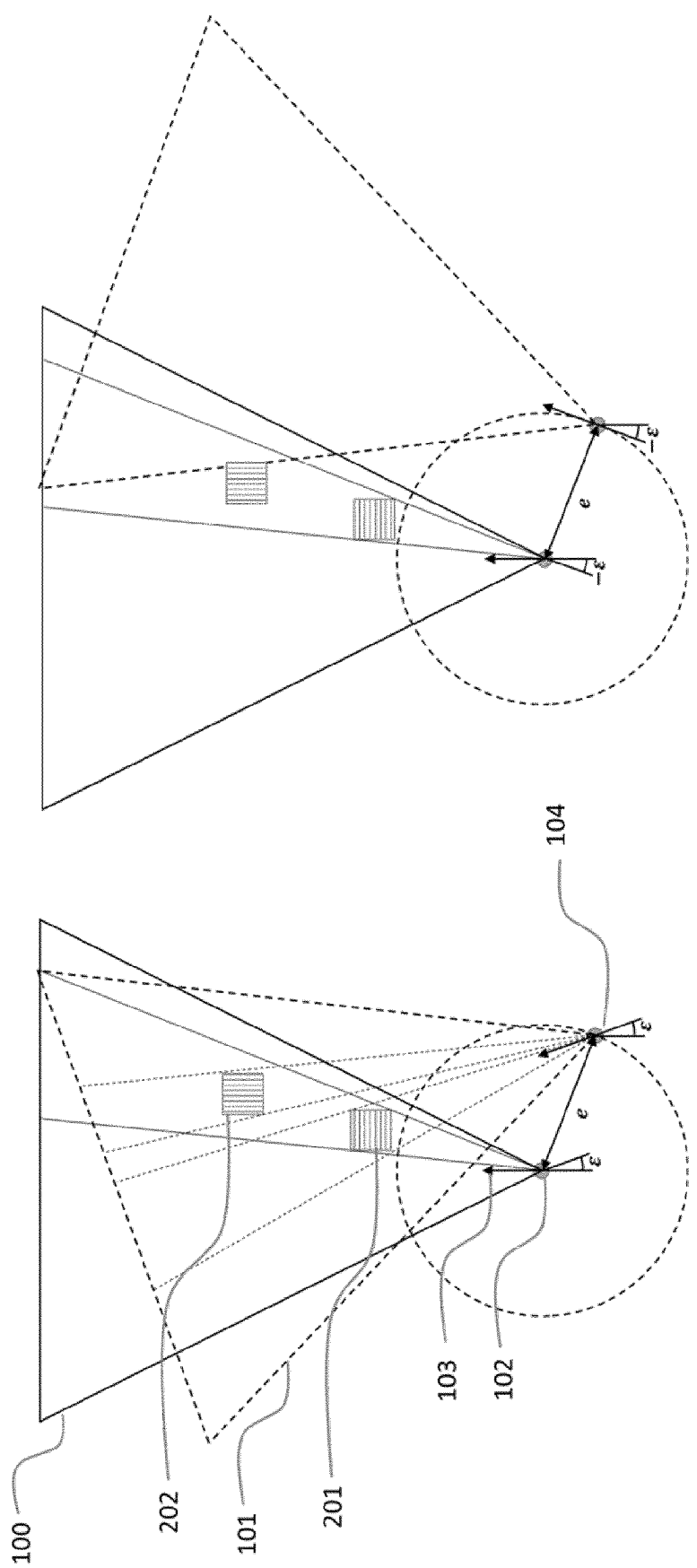
Figure 8:
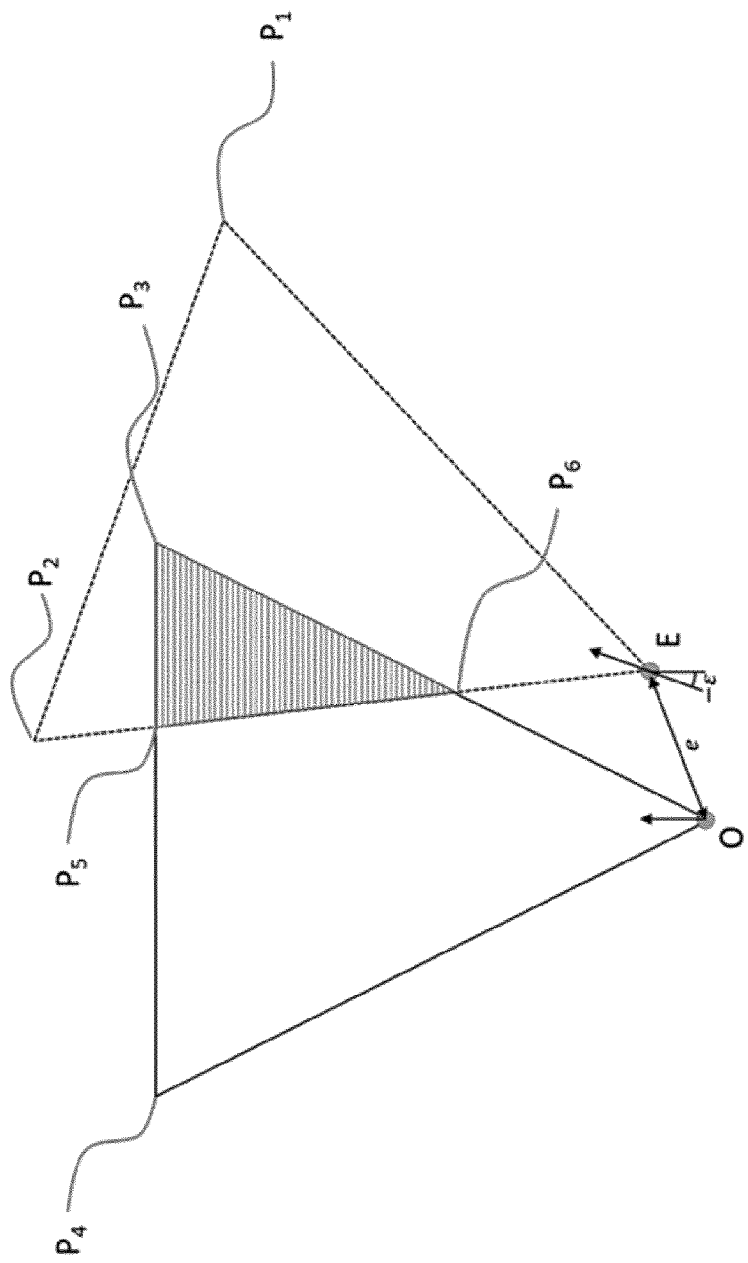
Figure 10A:
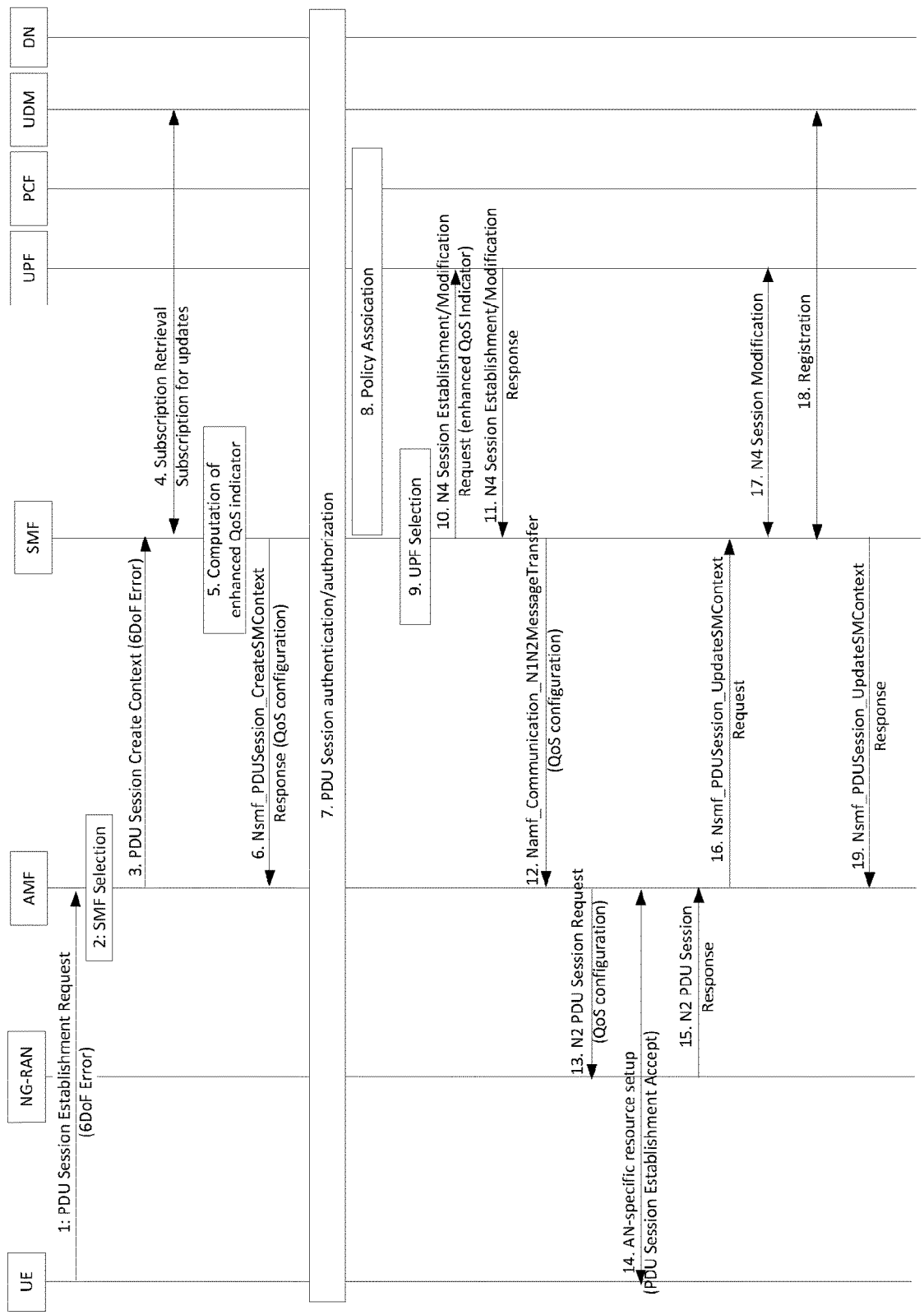
Figure 10B:
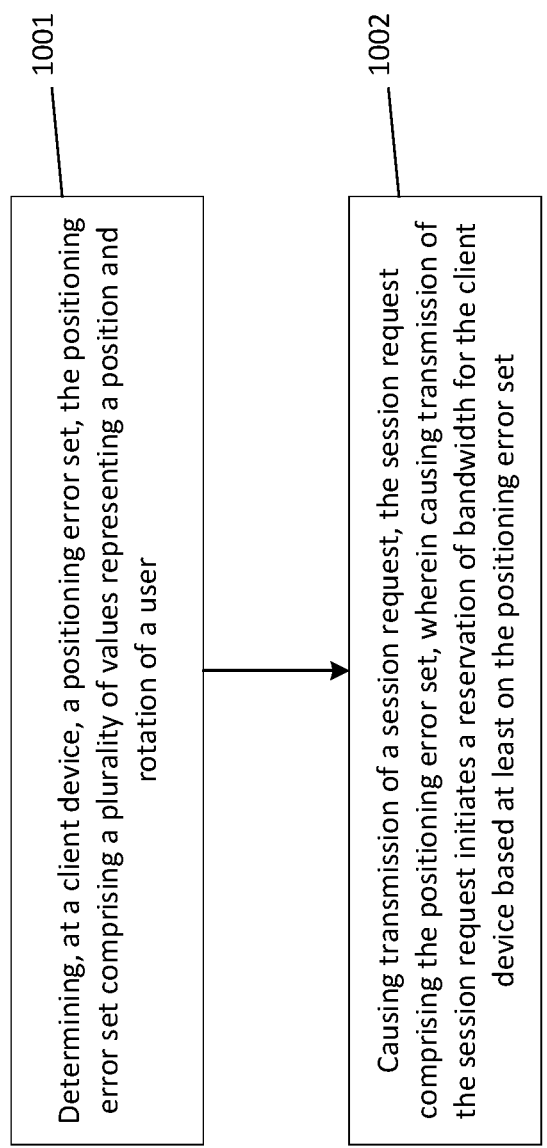
Figure 10C:
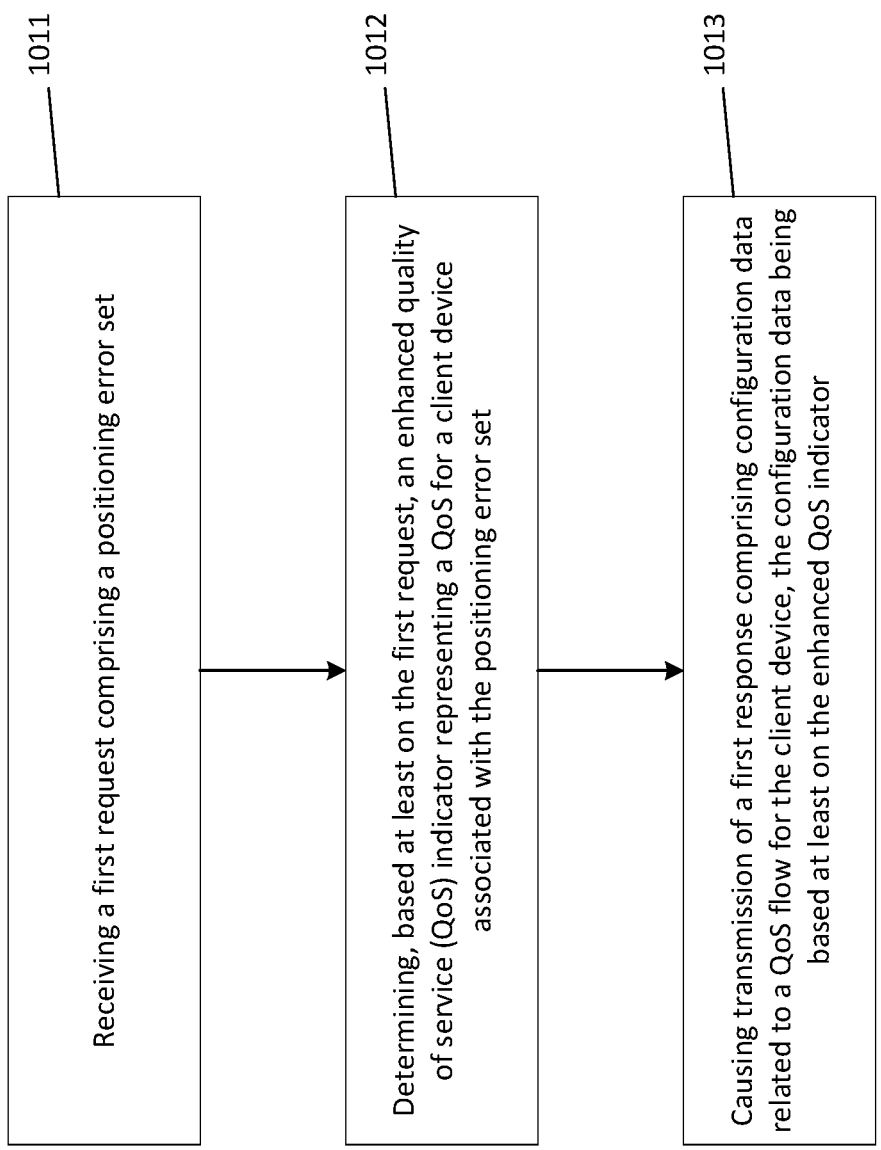
Figure 11:
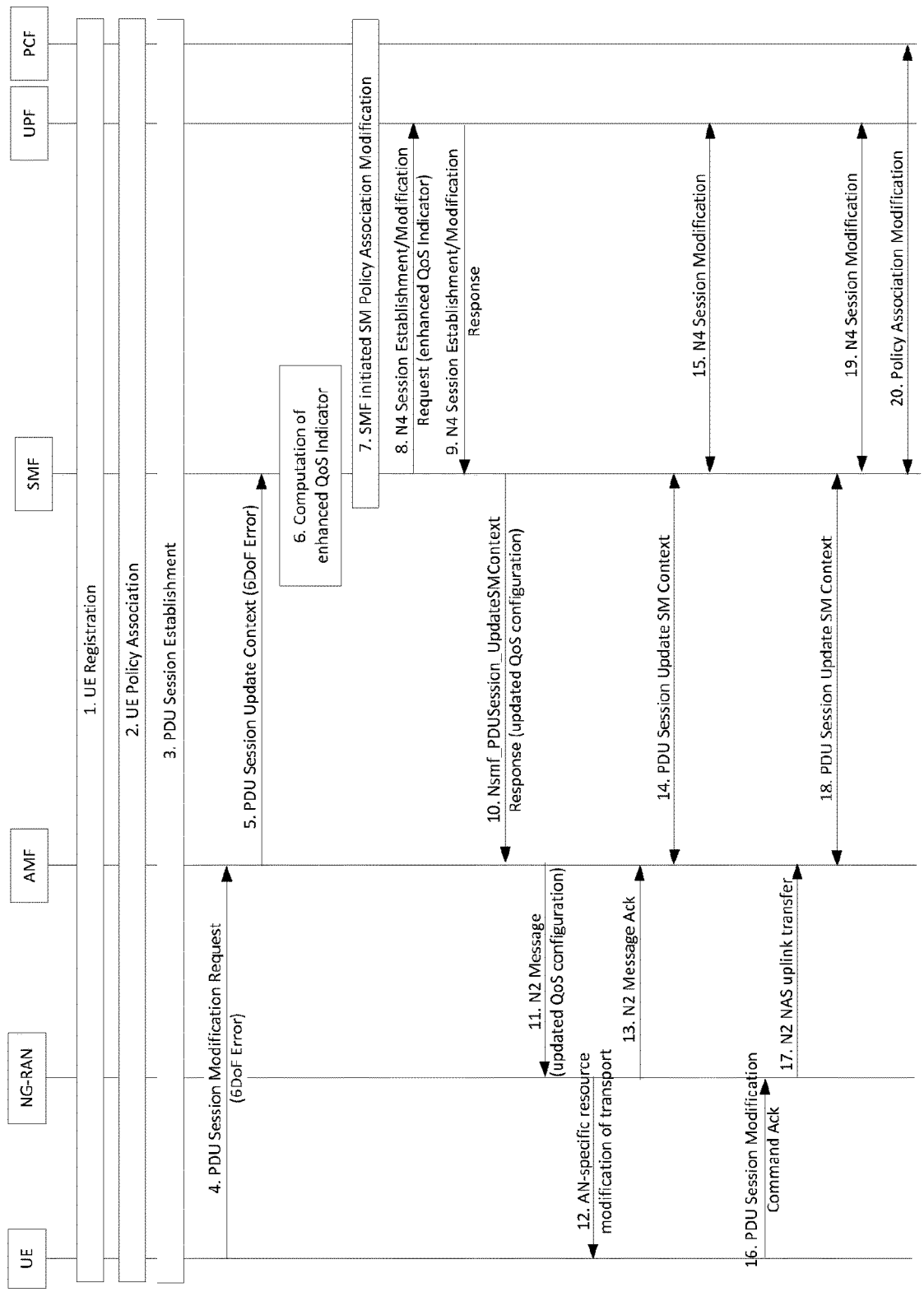
Figure 12:
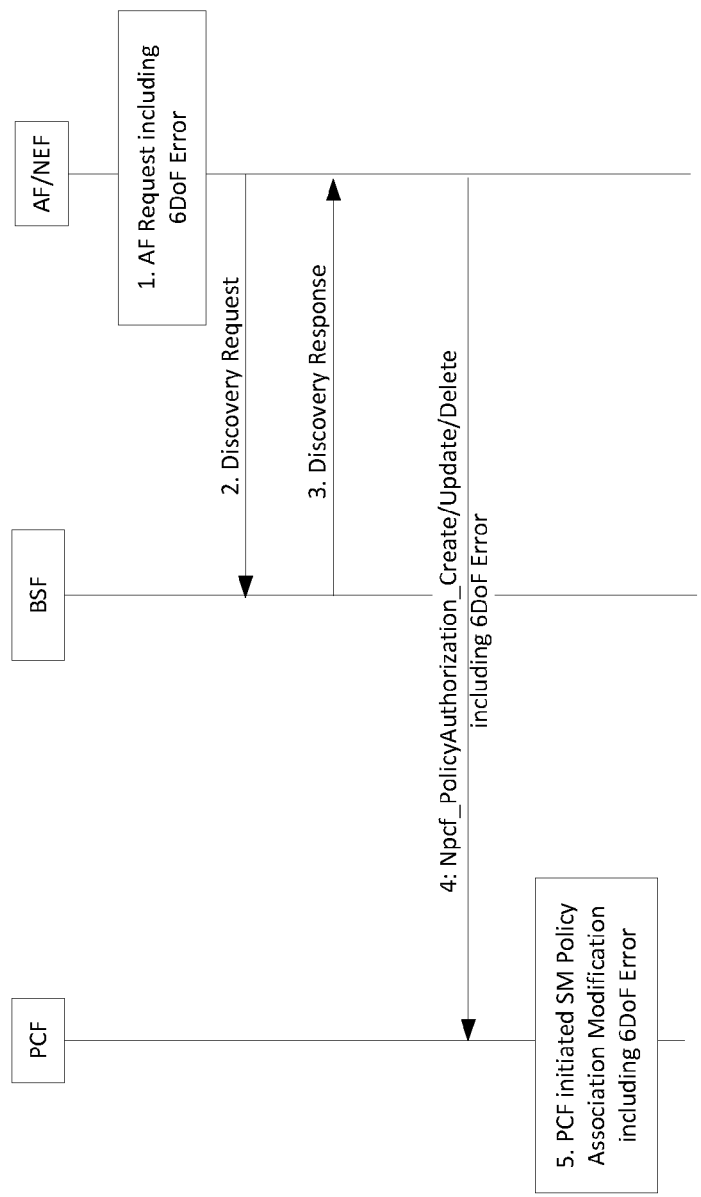
Figure 13:
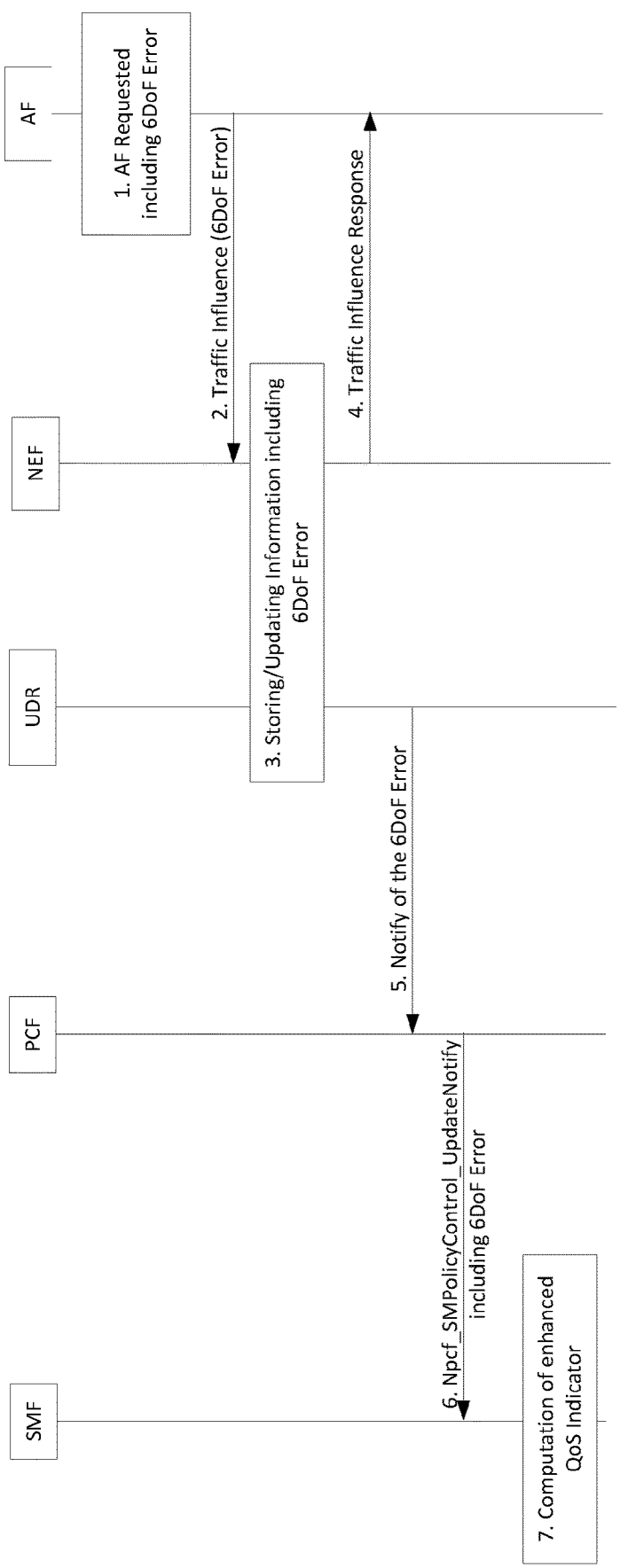
Figure 14A:
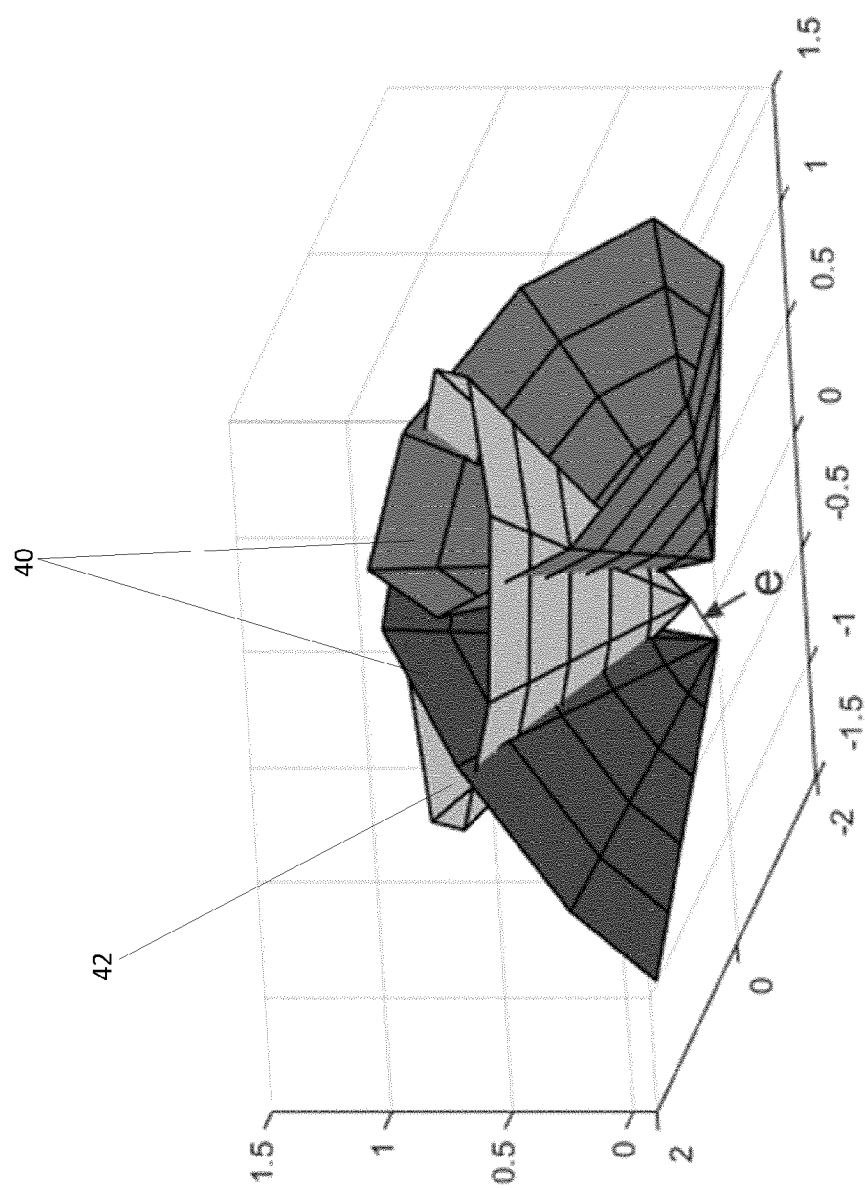
Figure 14B:
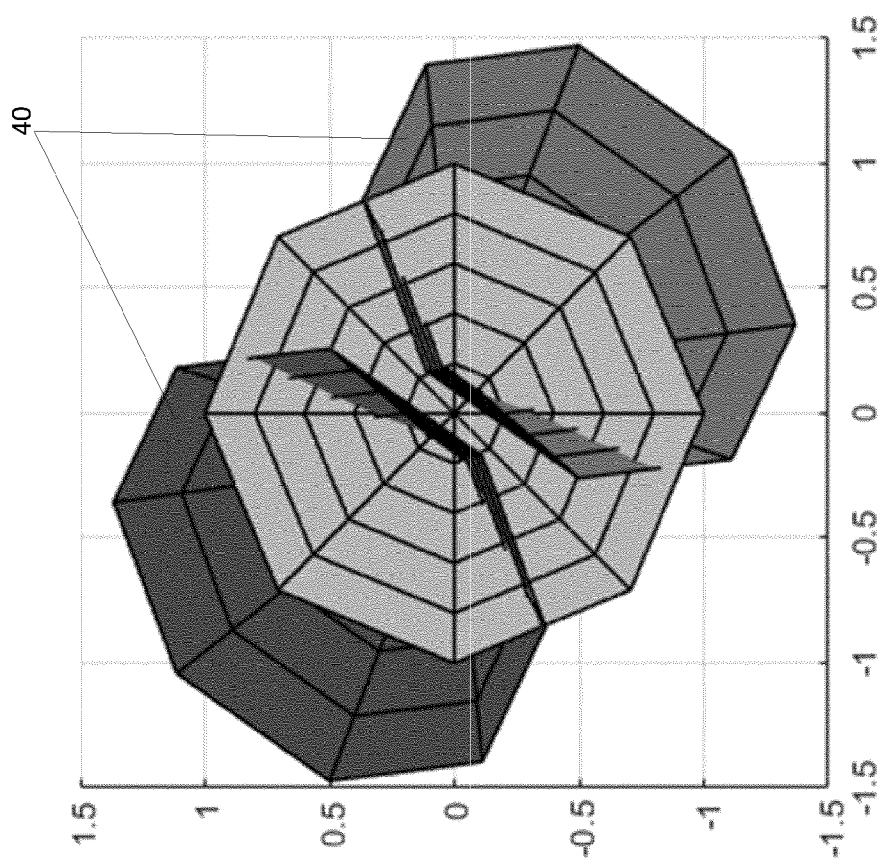
Figure 14C:
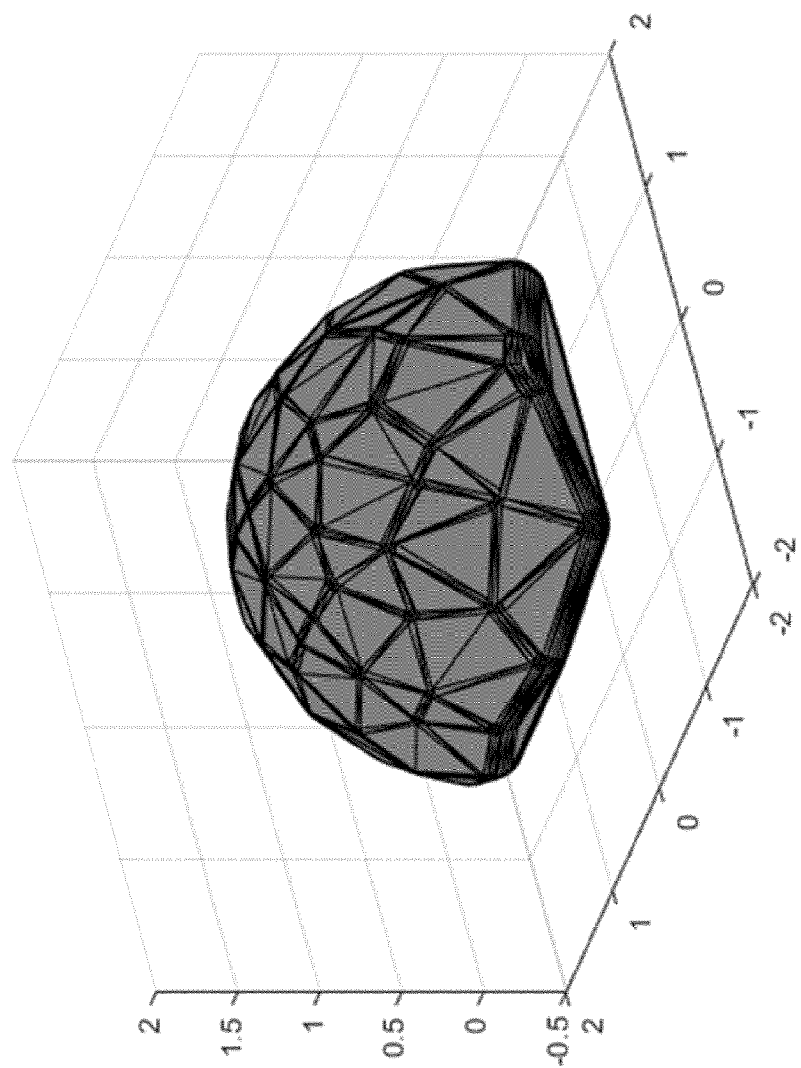
Figure 14D:
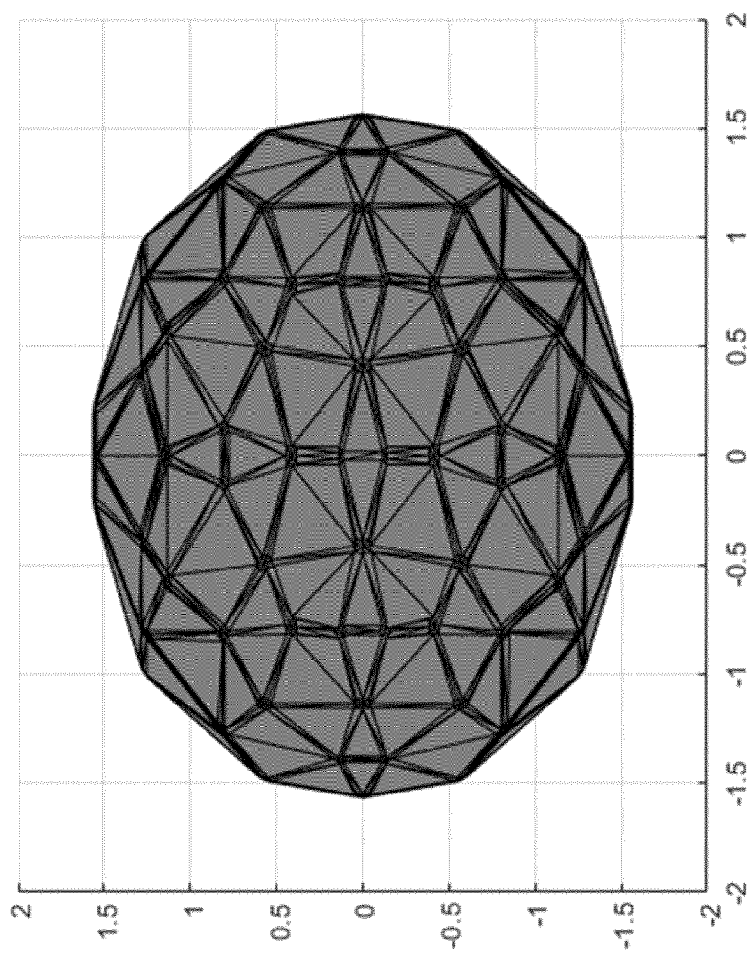
Figure 14E:
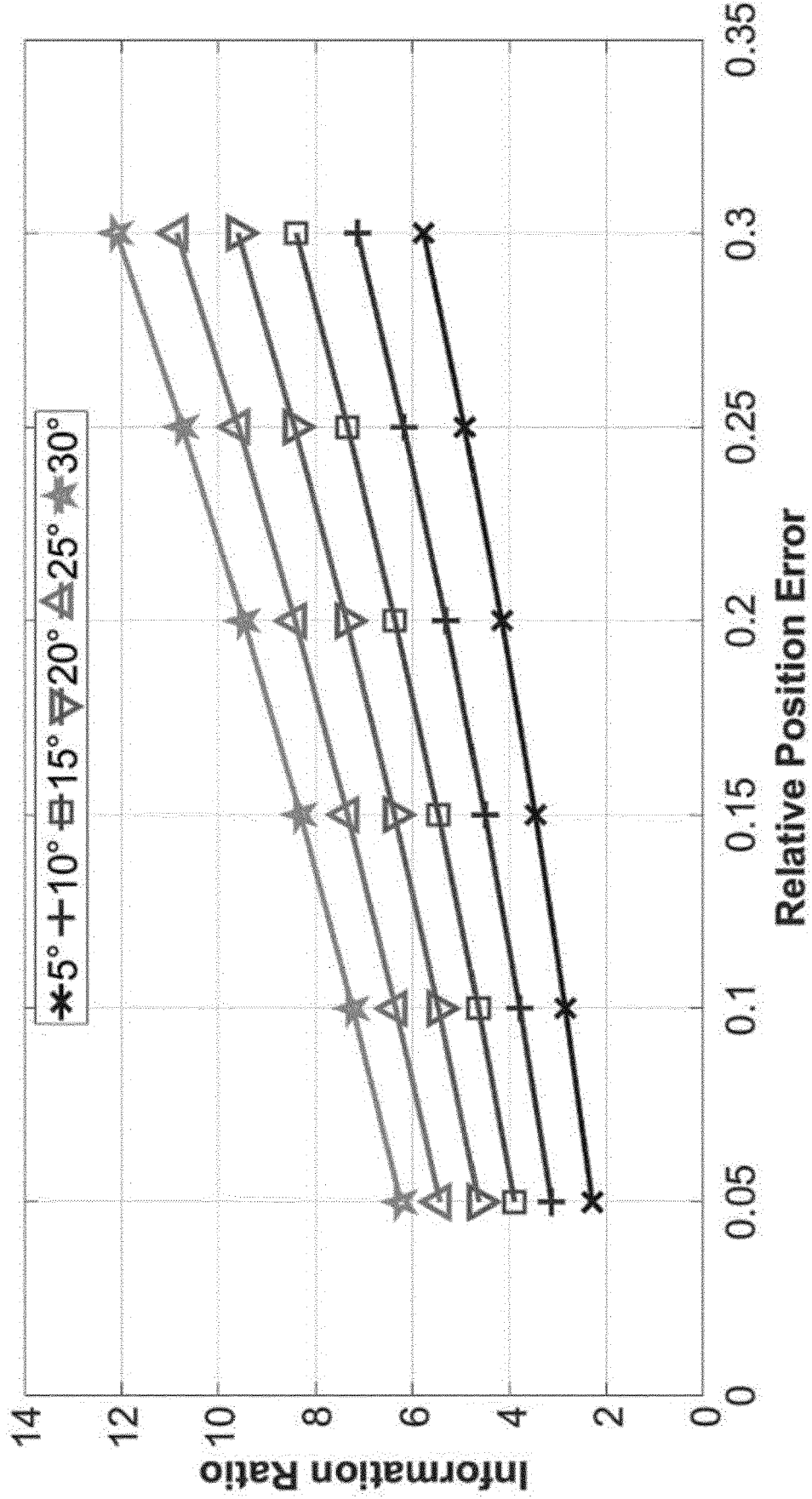

Having thus described certain example embodiments of the present disclosure in general terms, reference will hereinafter be made to the accompanying drawings, which are not necessarily drawn to scale, and wherein:

FIG. 1 illustrates an example representation of tiles at different qualities within the viewport (FoV) for viewport dependent streaming in accordance with an example embodiment;

FIG. 2 illustrates example depictions of correct and incorrect 3D tile-based representation in accordance with an example embodiment of the present disclosure;

FIG. 3 illustrates an example Downlink Protocol Stack for 5G-NR in accordance with some example embodiments;

FIG. 4 is a block diagram of a system including a source device and a client device configured to communicate via a network in accordance with an example embodiment;

FIG. 5 is a block diagram of an apparatus that may be specifically configured in accordance with an example embodiment of the present disclosure;

FIG. 6 is a flowchart illustrating the operations performed, such as by the apparatus of FIG. 5 in accordance with an example embodiment;

FIG. 7 is an example representation of maximum horizontal position and yaw angle errors in accordance with an example embodiment;

FIG. 8 is an example representation of a surface intersecting projections in accordance with an example embodiment;

FIG. 9 is an example representation of an enhanced Quality of Service (QoS) indicator for two XR services in accordance with an example embodiment;

FIG. 10A is a signal diagram illustrating the operations performed, such as by the apparatus of FIG. 5 in accordance with an example embodiment;

FIG. 10B is a flowchart illustrating the operations performed, such as by the apparatus of FIG. 5 in accordance with an example embodiment;

FIG. 10C is a flowchart illustrating the operations performed, such as by the apparatus of FIG. 5 in accordance with an example embodiment;

FIG. 11 is a signal diagram illustrating the operations performed, such as by the apparatus of FIG. 5 in accordance with an example embodiment;

FIG. 12 is a signal diagram illustrating the operations performed, such as by the apparatus of FIG. 5 in accordance with an example embodiment;

FIG. 13 is a signal diagram illustrating the operations performed, such as by the apparatus of FIG. 5 in accordance with an example embodiment;

FIG. 14A is an example representation of displacements and rotations of an actual Field of View (FoV) in accordance with an example embodiment;

FIG. 14B is an example representation of displacements and rotations of an actual Field of View (FoV) in accordance with an example embodiment;

FIG. 14C is an example representation of a convex hull in accordance with an example embodiment;

FIG. 14D is an example representation of a convex hull in accordance with an example embodiment; and FIG. 14E is an example representation of curves representing the information ratio (or guaranteed bandwidth) for a fixed maximum angle of rotation in accordance with an example embodiment.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device (such as a core network apparatus), field programmable gate array, and/or other computing device. Additionally, as used herein, the term 'module' refers to hardware or a combination of hardware and software in which the execution of the software directs operation of the hardware.

Overview

As described above, viewport-dependent streaming XR services (e.g., VR, AR, etc.) are typically implemented based on adaptive streaming schemes based on network status and pose/6DoF information to adjust the quality to the available bitrate and user FoV. In particular, in some examples of viewport dependent streaming, an omnidirectional 3D scene with respect to an anchor point (e.g., the position of the user observing the content) is spatially divided into independent subpictures or tiles as illustrated in FIG. 1. The streaming server may offer multiple representations of the same tile by storing tiles at different qualities by varying video parameters such as resolution, compression, and/or framerate. The download of new XR content can be triggered by head and user movements (e.g., by changes in pitch, yaw, roll, and/or coordinates), and/or the need to download the next portion of a 3D video. Once all tiles in the FoV are downloaded, they can be rendered to generate the 3D representation that is displayed to the user.

To minimize the bitrate of the downloaded 3D video stream, an XR client in a user device (herein referred to as "user equipment" (UE)) may request tiles at different qualities according to their position in the user FoV. Tiles in the narrow, mid and far peripheral FoV are downloaded at decreasing quality as illustrated in FIG. 1, since the perceived quality is not largely affected by the image displayed on the edge of the user's gaze.

Given the specific characteristics of XR services, the Third Generation Partnership Project (3GPP) defines Quality of Service (QoS) parameters and characteristics for these services. The Fifth Generation (5G) QoS model as defined in 3GPP TS 23.501 is based on QoS Flows, where the QoS Flow is the finest granularity of QoS differentiation in a Protocol Data Unit (PDU) session. A QoS Flow Identifier (ID) (QFI) is used to identify a QoS Flow in a 5G system. Each QoS Flow is assigned a certain 5QI (5G QoS Identifier) that maps to QoS characteristics. The 5G QoS model supports both QoS Flows that require guaranteed flow bit rate (GBR QoS Flows) and QoS Flows that do not require guaranteed flow bit rate (Non-GBR QoS Flows). User Plane traffic with the same QFI and 5QI within a PDU Session receives the same traffic forwarding treatment from a scheduler. The QFI is carried in an encapsulation header (e.g., a General Packet Radio Service Tunnelling Protocol (GTP-U) header) on N3 (and N9), e.g., without any changes to the e2e packet header.

In the 3GPP Specification (herein incorporated by reference), particularly TS 23.501, the 5G QoS characteristics that are defined for each 5QI include Resource Type (e.g., GBR, Delay Critical GBR or Non-GBR), Priority Level, Packet Delay Budget (PDB) (e.g., including Core Network Packet Delay Budget), Packet Error Rate (PER), Averaging Window (e.g., for GBR and Delay Critical GBR Resource Types), and Maximum Data Burst Volume (MDBV) (e.g., for Delay Critical GBR Resource Types).

These characteristics describe the packet forwarding treatment that a QoS Flow receives edge-to-edge between a UE and the User Plane Function (UPF). Standardized 5QI values are specified in the Table 5.7.4-1 of Section 5.7.4 in TS 23.501 for services that are assumed to be frequently used and thus benefit from optimized signalling by using standardized QoS characteristics. For example, AR services have the dedicated 5QI number 80, which defines a Packet Delay Budget (PDB) of 10 milliseconds (ms) (with 2 to 5 ms dedicated only for the radio interface), and a Packet Error Rate of 10-6. Real Time Gaming services have the dedicated 5QI number 3, that defines a Packet Delay Budget (PDB) of 50 ms, a Packet Error Rate of 10-3, and averaging window of 5000 ms.

In this regard, 5QI characteristics (e.g., PDB, PER, MDBV) are all standardized for a certain 5QI value. However, as described above, XR applications integrate adaptive streaming algorithms that optimize the bitrate of the XR session using network statistics and viewport information, which depends on the pose/6DoF information (e.g., position and angles of rotation) estimated by the UE and/or the network. Position and angle errors affect the QoE since only XR content within the FoV is sent to the UE with different qualities (e.g., latency, resolution, compression) according to the distance from the center of gaze. Errors in the positions and angles can be corrected by the XR application, assuming that sufficient information has been transmitted by the server. In this regard, the server must transmit a large amount of high-quality information to compensate the error, and the efficiency of the bitrate adaptation algorithm is negatively affected by the magnitude of the error.

FIG. 2 illustrates an example of this problem. The wrong position of the user leads to the reception of tiles in the near-peripheral (foveal) and mid-peripheral field of view with lower quality than expected. This causes a significant drop in the QoE of the user, since near-peripheral (foveal) and mid-peripheral are the portions of the FoV that are better perceived by humans. Similar errors are also caused by the wrong estimation of the angles on the rotation axis (e.g., yaw, pitch, roll). As shown in FIG. 2, viewport quality is affected by wrong positioning information. The left illustration 202 depicts the correct 3D tile-based representation, whereas the right illustration 204 depicts the wrong 3D tile-based representation due to position error. In this manner, two columns of tiles in the near-peripheral FoV of the user are incorrectly transmitted at mid-quality. Similarly, two columns of tiles in the mid-peripheral FoV are incorrectly transmitted at low-quality.

As described above, a wrong representation of the 3D image/video can be corrected at the receiver. For example, small rotational errors (pitch, yaw and roll) can be corrected by Asynchronous Time Warp (ATW), which transforms pre-rendered images stored in the buffer based on the most recent pose/6DoF tracking information before displaying the corrected image to the user. However, ATW cannot compensate position errors or large rotational errors without seriously affecting the users QoE. This requires the transmission of tiles with higher quality. The amount of extra information that must be transmitted to compensate for position and angle errors depends on the magnitude of the error. Therefore, there exists a relationship between the magnitude of 6DoF errors and the extra-bandwidth needed to compensate such an error.

Similar to the PER, which affects the achievable data rate due to maximum Modulation and Coding Scheme (MCS) selected by the Link Adaptation (LA), maximum 6DoF errors need to be provided to the network in order to modify the forwarding behavior of forwarded elements. Therefore, XR services require 5QI characteristics to reflect the 6DoF precision (deviation/error for both positions and angles of rotation) that are not captured by current 5QI specifications. For example, the admission control algorithm may consider the extra bandwidth needed to compensate the maximum 6DoF error to decide whether to admit an XR connection. Similarly, a scheduling algorithm could reserve more bandwidth for XR connections according to the magnitude of the 6DoF error.

FIG. 3 shows an example of the 3GPP NR user plane protocol stack. Here, the Service Data Adaptation Protocol (SDAP) (TS 37.354) is responsible for several functions, including mapping of QoS Flow to Data Radio Bearers (DRBs) and marking of QoS Flow ID as well as QoS in the packet header, determining which packets are available at the radio buffers for scheduling as well as setting the QoS parameters visible to the MAC scheduler, and determining queue management by enforcing QoS/QoE policies including traffic shaping of lower priority traffic to allow that the traffic of high priority applications with higher demand are delivered faster to lower layers (QoS/QoE management).

In general, a QoS Flow is the finest granularity to differentiate traffic forwarding treatment (e.g., scheduling). A QoS Flow may be a GBR QoS Flow or a Non-GBR QoS Flow. A QoS Flow may be identified by a QoS Flow ID (QFI), which can be dynamically assigned or equal to the 5QI. A QoS Flow also supports reflective QoS.

A QoS Flow is characterized by a QoS profile, which can include a 5G QoS Identifier (5QI), an Allocation and Retention Priority (ARP), as well as 5G QoS characteristics (described above) associated with each 5QI scalar, e.g., Resource Type, Priority Level, Packet Delay Budget, Packet Error Rate, Averaging Window, and Maximum Data Burst Volume. A QoS profile for a GBR QoS Flow can also include Guaranteed/Max Flow Bit Rate (GFBR/MFBR) upload/download (UL/DL), Notification Control, and Maximum Packet Loss Rate UL/DL. A QoS profile for a Non-GBR QoS Flow may also include a Reflective QoS Attribute (RQA). In addition to a QoS profile, a QoS Flow can also be characterized by one or more QoS rules and one or more Service Data Flow (SDF) templates.

Embodiments herein improve the QoS framework by defining quality indicators, parameters, and characteristics to model the sensitivity of XR services to errors in position and angles of rotation, herein referred to as 6DoF error(s). The 6DoF error defines the maximum error for the position and angles of rotation of the user FoV, and embodiments herein utilize characteristics such as PDB, PER, and Guaranteed Bandwidth/Bit Rate as functions of the 6DoF error. In this regard, the 6DoF error is used by the network, in some embodiments, to determine enhanced QoS parameters for an XR service such as guaranteed bandwidth to be reserved for GBR services.

Referring now to FIG. 4, a block diagram of a portion of a wireless network 400 is illustrated for providing QoS management for XR applications according to an example embodiment. It will be appreciated that the wireless network 400 as well as the illustrations in other figures are each provided as an example of some embodiments and should not be construed to narrow the scope or spirit of the disclosure in any way. In this regard, the scope of the disclosure encompasses many potential embodiments in addition to those illustrated and described herein. As such, while FIG. 4 illustrates one example of a configuration of a wireless network for providing QoS management for XR applications, numerous other configurations may also be employed.

The wireless network 400 may include user equipment (UE), such as one or more client devices, e.g., client devices 404 (examples of which include but are not limited to a head-mounted display, camera, omnidirectional video device, virtual reality system, augmented reality system, video playback device and/or the like), configured to wirelessly couple (e.g., via an air interface) to a radio access network (RAN) being served by a wireless access point, such as a base station 106, wireless local area network access point, home base station, and/or other type of wireless access point. While certain embodiments described herein relate to 5G networks, it is to be appreciated that networks other than 5G networks may be used.

The wireless network 400 may further include a core network 402, which may include a core access and mobility management function (AMF). The AMF may be used for various network tasks such as registration management, connection management, reachability management, mobility management, and/or other various functions relating to security and access management and authorization. The network 100 and/or core network may further include features such as a session management function (SMF) module. The SMF module may be used for various responsibilities such as, but not limited to, creating, updating, and/or removing Protocol Data Unit (PDU) sessions and managing session context with the User Plane Function (UPF) of the network. The SMF may also use the non-access stratum (NAS), a functional layer used to manage the establishment of communication sessions and to maintain continuous communications with UE, in order to inform the user device of changes in QoS parameters which the RAN may be currently fulfilling.

In some embodiments, the network 100 and/or the core network may include devices having functions supporting a home public land mobile network (HPLMN) and corresponding functions for "home" wireless local area network (WLAN) access, offloading, and/or non-3GPP access. These devices may include a unified data management (UDM) module, a unified data repository, an over-the-air function (OTAF) module, and/or other non-illustrated features such as a home policy control function (PCF), a home network slice selection function (NSSF), an authentication server function (AUSF), an application function (AF), a home user plane function (H-UPF), and a data network (DN) 406.

According to various embodiments, the wireless network 400 may be configured according to an architecture for providing for panoramic video streaming. For example, the system 400 may be configured to provide for immersive video streaming and techniques to support a wide variety of XR applications including VR and AR applications.

One example of an apparatus 500 that may be configured to function as the client device 404, a Session Management Function (SMF), a core access and mobility management function (AMF), an Application Function (AF), and/or another network entity is depicted in FIG. 5. As shown in FIG. 5, the apparatus 500 includes, is associated with or is in communication with processing circuitry 52, a memory 54 and a communication interface 56. The processing circuitry may be in communication with the memory device via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processing circuitry). The memory device may be configured to store information, data, content, applications, instructions, or the like for enabling the apparatus to carry out various functions in accordance with an example embodiment of the present disclosure. For example, the memory device could be configured to buffer input data for processing by the processing circuitry. Additionally, or alternatively, the memory device could be configured to store instructions for execution by the processing circuitry.

The apparatus 500 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processing circuitry 52 may be embodied in a number of different ways. For example, the processing circuitry may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally, or alternatively, the processing circuitry may include one or more processors configured in tandem via the bus to enable independent execution of instructions, pipelining and/or multithreading.

In an example embodiment, the processing circuitry 52 may be configured to execute instructions stored in the memory device 54 or otherwise accessible to the processing circuitry. Alternatively, or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of instructions, the instructions may specifically configure the processor to perform the algorithms and/or operations described herein when the instructions are executed. However, in some cases, the processing circuitry may be a processor of a specific device (e.g., an image or video processing system) configured to employ an embodiment of the present invention by further configuration of the processing circuitry by instructions for performing the algorithms and/or operations described herein. The processing circuitry may include, among other things, a clock, an arithmetic logic unit (ALU) and logic gates configured to support operation of the processing circuitry.

The communication interface 56 may be any means such as a device or circuitry embodied in either hardware or a combination of hardware and software that is configured to receive and/or transmit data, including media content in the form of video or image files, one or more audio tracks or the like. In this regard, the communication interface may include, for example, an antenna (or multiple antennas) and supporting hardware and/or software for enabling communications with a wireless communication network. Additionally, or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

It is to be understood that signaling between the source device 402 and the client device 404 may be carried out over any protocol at any layer of the International Organization for Standardization (ISO) Open Systems Interconnection (OSI) protocol stack (e.g., Session Description Protocol (SDP), Session Initiation Protocol (SIP), Real Time Streaming Protocol (RTSP), Real-Time Transport Protocol (RTP), Real-Time Transport Control Protocol (RTCP), Moving Pictures Experts Group Dynamic Adaptive Streaming over Hypertext Transfer Protocol (HTTP) (MPEG DASH) and the like). It is to be understood that reference to 'downloading' and 'streaming' data herein, while perhaps implemented through different transport protocol mechanisms, relate to similar functional concepts in this context.

Embodiments herein provide determination of enhanced QoS parameters (e.g., guaranteed bandwidth) of an XR service as a function of 6DoF errors. In this regard, maximum 6DoF errors may be defined as characteristics of a QoS Profile defined for a QoS Flow that maps an XR service. In some embodiments, 6DoF errors may be defined as relative or absolute errors with respect to any coordinate reference system and can be independently defined for position (e.g., horizontal, vertical) and angles (e.g., yaw, pitch, roll). The 6DoF errors may then be communicated to one or more network entities in order to modify forwarding behavior, such as, for example, reserving additional capacity for guaranteed bitrate (GBR) services. Several methods are described below, which include a method to compute enhanced QoS (eQoS) parameters as a function of 6DoF errors, as well as additional methods to communicate the eQoS parameters, which may be initiated by UE or a network entity after a PDU session is established.

FIG. 6 illustrates example operations to estimate enhanced QoS parameters (eQoS) as a function of maximum 6DoF error. One example of eQoS parameters is the guaranteed bandwidth/bitrate (which is a function of 6DoF error) to be reserved for GBR services. Indeed, 6DoF errors affect both the guaranteed bitrate and the maximum bitrate that are explicitly requested by the UE according to TS 23.107, since these two bitrate parameters are increased by the same factor, which is a function of the 6DoF error.

The 6DoF error (also herein referred to as a positioning error set) may consist of a set of maximum deviations for coordinates defining a position and the angles defining a rotation of a user (e.g., a user using client device 404). Coordinates and angles and their maximum errors may be defined in a coordinate reference system. In some embodiments, a coordinate reference system may be used that is centered at the real user position with orientation in the direction of the user view. Therefore, the origin represents the real user position and null angles represent the center and main direction of the real user FoV. In some embodiments, other systems such as the Geographical Reference System (GRS) may be used assuming that there exists a transformation from the two reference systems. The FoV may be represented as a cone with an apex/vertex at the user position, a base radius equal to half the horizontal FoV, and a height equal to the maximum working distance. The FoV may also be represented, in some embodiments, as a pyramid, cylindric or more complex polyhedron.

In some embodiments, a Euclidean distance may be determined to the define the maximum horizontal and vertical errors of the position, while absolute values may be used to define the maximum errors for the rotation angles (e.g., yaw, pitch, and roll).

FIG. 7 depicts an example representation of maximum horizontal position and yaw angle errors, which are identified by e and $\varepsilon$, respectively. The error e defines the maximum horizontal displacement with respect to the real position 102, while the error $\varepsilon$ defines the maximum interval of the yaw angle $\psi$ (e.g., $-\varepsilon \leq \psi \leq \varepsilon$) with respect to the real direction of the user view 103. Similar errors may be defined for vertical position and other rotation angles (e.g., roll and pitch). As shown in FIG. 7, the solid triangle 100 represents the projection of the real FoV on the x,y plane, while the dashed triangle 101 represents the projection of the FoV distorted by the position and rotation errors. The point 102 and the arrow 103 represent the real position and direction of view of the user. The point 104 indicates a possible incorrect user position due to the displacement caused by the error of the positioning system, which is bounded by the maximum position error e. All points within the dashed circle represent possible realizations of the positioning error.

Returning to FIG. 6, a method is shown which determines the guaranteed bitrate as a function of 6DoF errors. The method includes computing the volume of the space that is not covered by the sampled user FoV but that could be covered if the FoV is displaced by e and rotated by any angle in $-\varepsilon \leq \psi \leq \varepsilon$. Herein, reference will be made to the sampled user FOV as $FOV_O$, which is centered at $O=(x_O, y_O, z_O)$, as well as the displaced/rotated FOV as $FOV_E$.

FIG. 8 depicts an example representation of a surface intersecting the projections of $FOV_O$ and $FOV_E$ onto the x,y plane as a shaded triangle. This part of the surface and the corresponding volume limited by this surface may be neglected in the computation of the guaranteed bandwidth/bitrate. In this regard, the volume of the shaded triangle is already captured by the user FoV and the representation of the objects falling inside this area can be re-projected when the FoV is displaced from O to E and rotated by $-\varepsilon$ degrees.

In this regard, a portion of $FOV_O$ must be neglected in the computation of the guaranteed bandwidth/bitrate for each possible $FOV_E$ placement obtained by placing its vertex at any point within the sphere representing the maximum displacement e (e.g., the circle in the x,y projection illustrated in FIG. 8) and by rotating its direction axis by any degree within the range $-\varepsilon \leq \psi \leq \varepsilon$.

In this regard, the method shown in FIG. 6 determines the extreme points of the 3D solid resulting from the intersection of $FOV_O$ and $FOV_E$. These extreme points correspond to the original vertices of $FOV_O$ and $FOV_E$ and all the vertices that are generated by the intersection of any two lines belonging to $FOV_O$ and $FOV_E$. From these set of vertices, vertices that that fall into the overlapping volume can be removed. This procedure is repeated for any point and angle generated to sample all possible displacements and rotations according to the parameters representing the 6DoF errors. Once all these points and angles have been considered, the a convex hull is generated from the extreme points contained in $L_P$. In some embodiments, the convex hull can be determined using algorithms such as, for example, quickhull or Chen's algorithms. The volume of the convex hull as well as the volume of the user's FoV ($FOV_O$) are then computed. Their ratio, referred to herein as the Information Ratio (IR), may be used as an estimation of the guaranteed bandwidth/bitrate that is to be communicated as part of the eQoS parameters.

Additional enhancements may be utilized in some embodiments to speed up the determination. For example, if the space around the user's FoV is uniform, only a portion of all possible displacements and angles may be considered. Due to symmetry, the overlapping volume when $FOV_E$ is displaced by $-e$ (e.g., $E=(X_O-e, y_O, z_O)$) and rotated on the yaw axis by $\psi=\varepsilon$ is equal to the overlapping volume with positive displacement e and rotation on yaw axis $\psi=-\varepsilon$. Therefore, only half of the sphere centered at O with radius e may be considered to compute the volume of the convex hull and double it to determine an estimation of the overall non-overlapping volume covered by all possible displacements due to the 6DoF errors.

To illustrate, as shown in FIG. 8, an example representation of the method of FIG. 6 is shown in relation to 2D projections of $FOV_O$ and $FOV_E$ (which may be extended to 3D). As shown, a set of extreme points selected when $FOV_E$ is placed at E and rotated by $-\varepsilon$ are $\{O, E, P_1, P_2, P_3, P_4, P_5, P_6\}$. An optimization that can be utilized to exclude from the set $L_P$ the extreme points that are dominated by other points and the points that belong to the overlapping and/or intersecting area (in 2D) or volume (in 3D). With such an optimization points $P_3$, $P_5$ and $P_6$ can be excluded, since they fall into $FOV_O$ (e.g., in the overlapping area).

In some embodiments, the additional information to be sent to cover the 6DoF error may depend also on the elements and objects contained in the virtual space, since portions or even entire objects may disappear or appear when a rotation and/or displacement is applied to the user FoV. For example, in FIG. 7, object 202 cannot be seen from position O since it is covered by object 201, but it can be seen when the displacement and rotation is applied that results in the dashed triangle representing $FOV_E$. To consider the objects in the virtual space, using, for example, Point Cloud Compression (PCC) techniques, the method illustrated in FIG. 6 may be modified by counting all the distinct/unique points that fall in the two FOVs and repeat this process for all possible displacements and rotations. Another embodiment may include executing the same operations indicated in FIG. 6 with the exception of the computation of the volumes of the convex hull and FoV. In this regard, these operations may be replaced by counting the number of unique points $N_P$ in the convex hull and the number of unique points $N_O$ in the $FOV_O$, and computing the addition bandwidth as the ratio between $N_P$ and $N_O$.

While the 6DoF error can be used to change QoS parameters of the XR QoS Flow such as the guaranteed bitrate, the dependency between 6DoF error and QoS parameters is bidirectional. In this regard, QoS parameters like latency/Packet Delay Budget (PDB) and Packet Error Rate (PER) may also affect the 6DoF error. For example, a high PER may limit the maximum transmission rate in bad radio conditions. Therefore, a high PER can limit the maximum 6DoF error, since the additional used bandwidth to send the extra information used to compensate the 6DoF error might not be guaranteed in certain radio and network conditions.

6DoF error may be defined and indicated in several manners. In some embodiments, the 6DoF may comprise a definition of a maximum deviation for each coordinate from the real user position and the maximum rotational angle from the real user FoV direction. This requires the definition of six (6) real values, including one value for each of the three coordinate axes (e.g., values for x, y, and z) and one angle (e.g., a degrees measurement) for each of the three rotational axes (e.g., values for yaw, pitch, and roll). Additional representations/definitions may consider relationships and constraints among the coordinates and rotational angles. For example, the positioning error in the 6DoF error can be represented by considering maximum horizontal and vertical distances. If a same value for horizontal and vertical positioning error is used, the points representing the displacement from the real user position on the surface of a sphere centered at the real user position may be binded. Similarly, a single value for the rotational angles may be used, thus requiring only two values for the definition of the 6DoF error (e.g., a distance for the displacement error and an angle for the rotation error). Units of measure for the 6DoF error may be meters for positioning errors and degrees or radians for rotational angles. Further optimizations may consider the discretization of position and rotation errors (e.g., Low, Medium, High) to reduce the amount of information needed for their representation.

The 6DoF error may be included as part of a 5QI description, or, in some embodiments, the 6DoF error may be an additional parameter that is used to calculate the QoS configuration to be applied to a specific PDU session. The 5QI that contains or is calculated based on the 6DoF error may be referred to herein as an "enhanced QoS indicator."

In circumstances in which the enhanced QoS Indicator comprises the 6DoF error, then it will have, on top of the already defined QoS characteristics (TS 23.501-Section 5.7.4), an indication of the 6DoF error. In this regard, the Table 5.7.4-1 of TS 23.501-Section 5.7.4 may include one additional column labeled as, for example, "6DoF Error."

FIG. 9 shows an example representation of an enhanced QoS indicator for two XR services, with a first example enhanced QoS indicator 92 not including 6DoF error (as indicated in the "Max 6DoF Error" column showing values as zero (0)) and a second example enhanced QoS indicator 94 including 6DoF error. In other embodiments, different value ranges may be used to indicate 6DoF error. For example, values of "low," "medium," and "high" may be used for the three rotational and/or coordinate axes. In circumstances with reduced degrees of freedom, the full positioning error may not need to be included.

In some embodiments, the reservation of guaranteed bitrate/bandwidth as a function of the 6DoF errors may be performed by either the UE or a network entity (e.g., an SMF). The additional bandwidth reservation may be performed using enhancements of a session initiation procedure (e.g., a PDU Session Establishment) or, in some embodiments, enhancements of the session modification procedure (e.g., a PDU Session Modification), described below.

FIG. 10A depicts an example signal diagram detailing operations performed UE initiated reservation of additional bandwidth as a function of 6DoF errors using a session initiation procedure (e.g., a PDU Session Establishment).

As shown, the operations begin by the UE (e.g., client device 404) causing transmission of a PDU session establishment request. Briefly turning to FIG. 10B, operations performed at the client device are shown. As shown in operation 1001, the apparatus 500 includes means, such as the processor, memory, and/or the like, for determining a positioning error set, the positioning error set comprising a plurality of values representing a position and rotation of a user. The positioning error set may be determined as described above, such as by the operations detailed in FIG. 6.

At operation 1002, the apparatus 500 includes means, such as the processor, communication interface, and/or the like, for causing transmission of a session request, the session request comprising the positioning error set, wherein causing transmission of the session request initiates a reservation of bandwidth for the client device based at least on the positioning error set. In other words, once a positioning error set (e.g., the 6DoF error) is determined at the client device, the client device may include information associated with the 6DoF error within a session request, such as a PDU session establishment request, or, in some embodiments, a PDU session modification request (e.g., once a PDU session has already been established).

Returning to the signal diagram of FIG. 10A, at operation 1 of FIG. 10A, the PDU session establishment request is sent to the AMF of the core network. The request may comprise (in addition to the fields described in TS 23.502 clause 4.3.2) the current 6DoF error, determined locally at the client device as described above, using, for example, local sensing capabilities (e.g., Global Positioning System (GPS), Global Navigation Satellite System (GLONASS), or any other positioning technology).

As shown, at operation 2 of FIG. 10A, the AMF may then select the SMF to handle the PDU Session Create Request (e.g., as described in TS 23.502 clause 4.3.2). At operation 3 of FIG. 10A, the AMF may then transmit, to the selected SMF, the Nsmf_PDUSession_CreateSMContext Request including the UE's 6DoF error as well as the information described in TS 23.502 clause 4.3.2. Alternatively, in some embodiments, it may provide the Nsmf_PDUSession_UpdateSMContext Request, including the UE's 6DoF error.

Briefly turning to FIG. 10C, operations performed at the SMF are shown. As shown in operation 1011, the apparatus 500 includes means, such as the processor, communication interface, and/or the like, for receiving a first request comprising a positioning error set. As described above, the first request may be a Nsmf_PDUSession_CreateSMContext request or a Nsmf_PDUSession_UpdateSMContext request received from the AMF.

Returning to FIG. 10A, at operation 4 of FIG. 10A, the SMF retrieves the Session Management Subscription from the UDM, which includes the default QoS Indicator for the UE.

At operation 5 of FIG. 10A, the SMF computes an enhanced QoS indicator which is needed to provide, to the UE, the required QoS for the provided 6DoF Error. This operation may include execution of operations such as the operations discussed above with reference to FIG. 6. In this regard, at operation 1012 of FIG. 10C, the apparatus includes means, such as the processor, memory, and/or the like, for determining, based at least on the first request, an enhanced quality of service (QoS) indicator representing a QoS for a client device associated with the positioning error set.

At operation 6 of FIG. 10A, the SMF responds to the AMF through a Nsmf_PDUSession_CreateSMContext Response. This response may include the QoS rule(s), QoS rule operation(s), QoS Flow level QoS parameters if needed for the QoS Flow(s) associated with the QoS rule(s) considering the newly determined enhanced QoS indicator. In some embodiments, the enhanced QoS indicator may be included in the response. In other embodiments, the enhanced QoS indicator may not be included in the response. In this regard, at operation 1013 of FIG. 10C, the apparatus includes means, such as the processor, communication interface, and/or the like, for causing transmission of a first response comprising configuration data related to a QoS flow for the client device, the configuration data being based at least on the enhanced QoS indicator.

At operation 7 of FIG. 10A, optional secondary authentication/authorization may be performed. At operation 8 of FIG. 10A, the SMF performs Policy Association either locally or via interactions with the Policy Control Function (PCF).

At operation 9 of FIG. 10A, the SMF selects a Session Service Continuity (SSC) mode for the PDU Session (e.g., as described in TS 23.501 clause 5.6.9.3). The SMF may also selects one or more UPFs as needed (e.g., as described in TS 23.501 clause 6.3.3). The SMF may also perform an SMF-initiated SM Policy Association Modification procedure (e.g., as described in TS 23.502 clause 4.3.2).

At operation 10 of FIG. 10A, if the Request Type indicates that the request is an initial request, e.g., "initial request," the SMF initiates an N4 Session Establishment procedure with the selected UPF(s), otherwise it initiates an N4 Session Modification procedure with the selected User Plane Function (UPF). The request may contain the enhanced QoS indicator.

At operation 11 of FIG. 10A, the UPF acknowledges the N4 procedure by sending an N4 Session Establishment Response or an N4 Session Modification Response. At operation 12 of FIG. 10A, the SMF provides a Namf_Communication_N1N2MessageTransfer message to the AMF. This message may include the QoS rule(s), QoS rule operation, QoS Flow level QoS parameters if needed for the QoS Flow(s) associated with the QoS rule(s) considering the new enhanced QoS indicator (if they have not been provided earlier, for example in operation 6 of FIG. 10A).

At operation 13 of FIG. 10A, the AMF may transmit, to base station 106 (e.g., RAN), an N2 PDU Session Request, which may contain the QoS configuration data. At operation 14 of FIG. 10A, the RAN may issue a specific signalling exchange with the UE related to the information received from SMF (e.g., the QoS configuration data). At operation 15 of FIG. 10A, the RAN causes transmission of a N2 PDU Session Response to the AMF, the response comprising details of the PDU session establishment (e.g., which flows it cannot accept). At operation 16 of FIG. 10A, the AMF forwards the information received from the RAN to the SMF.

At operation 17 of FIG. 10A, the SMF initiates an N4 Session Modification procedure with the UPF based on the information that has been received from RAN. At operation 18 of FIG. 10A, in particular registration cases, the SMF may perform registration of the PDU session to the UDM (e.g., as indicated in TS 23.502 clause 4.3.2). At operation 19 of FIG. 10A, SMF may provide to the AMF the Nsmf_PDUSession_UpdateSMContext Response (e.g., as indicated in TS 23.502 clause 4.3.2).

As described above, the UE-initiated reservation of additional bandwidth as a function of 6DoF errors can be based on Rel. 16 TS 23.502 or on any other session modification procedure. This modification procedure may be occur in a circumstance in which the network allocated the default QoS indicator to the UE without following the operations described in FIG. 10A. Additionally, or alternatively, this modification procedure may be occur in a circumstance in which an allocated QoS indicator requires and update due to a change in the 6DoF error (e.g., the UE moves to an environment where the positioning is less or more accurate). The modification procedure of an allocated QoS Indicator to a PDU session is described in detail below with reference to FIG. 11.

At operation 1 of FIG. 11, the UE performs an initial registration to the core network (e.g., 5GC) as described in TS 23.502 clause 4.2.2.2.2. At operation 2 of FIG. 11, a UE Policy Association Establishment is performed as described in TS 23.502 clause 4.16.11.

At operation 3 of FIG. 11, the UE performs a PDU Session Establishment as described in TS 23.502 clause 4.3.2. The PDU session establishment uses the default enhanced QoS indicator, the enhanced QoS indicator is an indicator like the 5QI of the 5G System, or any other similar QoS indicator that can accommodate AR/XR services effectively.

At operation 4 of FIG. 11, the UE causes transmission of a PDU Session Modification Request to the AMF which comprises the 6DoF Error determined locally at the UE.

At operation 5 of FIG. 11, AMF provides a PDU Session Update Context Message to the SMF, the PDU Session Update Context Message comprising the 6DoF Error from the UE.

At operation 6 of FIG. 11, the SMF computes an enhanced QoS indicator which is needed to provide, to the UE, the required QoS for the provided 6DoF Error. This operation may include execution of operations such as the operations discussed above with reference to FIG. 6.

At operation 7 of FIG. 11, in some embodiments, the SMF may need to report a subscribed event to the Policy Control Function (PCF) by performing an SMF-initiated SM Policy Association Modification procedure (e.g., as defined in TS 23.502 in clause 4.16.5.1).

At operation 8 of FIG. 11, in some embodiments, the SMF may modify the redundant transmission for the QoS Flow as indicated in TS 23.502 in clause 4.3.3.2

At operation 9 of FIG. 11, a response from the UPF is received at the SMF.

At operation 10 of FIG. 11, the SMF causes transmission of a response to the AMF through a Nsmf_PDUSession_UpdateSMContext Response message which comprises updated QoS rule(s), QoS rule operation, QoS Flow level QoS parameters if needed for the QoS Flow(s) associated with the QoS rule(s) based on the new enhanced QoS indicator.

At operation 11 of FIG. 11, in some embodiments, the AMF may transmit a N2 (e.g., N2 SM information received from SMF) NAS message (PDU Session ID, N1 SM container (PDU Session Modification Command—based on the enhanced QoS indicator)) to the NG-RAN. At operation 12 of FIG. 11, the NG-RAN may issue a AN-specific signalling exchange with the UE that is related with the information received from SMF. At operation 13 of FIG. 11, the NG-RAN may acknowledge N2 PDU Session Request by transmitting a N2 PDU Session ACK.

At operation 14 of FIG. 11, the AMF may forward the N2 Session Management information and the user location information received from the NG-RAN to the SMF via a Nsmf_PDUSession_UpdateSMContext service operation. The SMF may cause transmission of a reply with a Nsmf_PDUSession_UpdateSMContext Response (e.g., as indicated in TS 23.502 in clause 4.3.3.2).

At operation 15 of FIG. 11, the SMF may update a N4 session of the UPF(s) that are involved by the PDU Session Modification by sending a N4 Session Modification Request message to the UPF. This may enable the transfer of the uplink packets. The UPF may respond to the request message accordingly.

At operation 16 of FIG. 11, the UE acknowledges the PDU Session Modification Command by causing transmission of a NAS message. At operation 17 of FIG. 11, the NG-RAN may forward the NAS message to the AMF.

At operation 18 of FIG. 11, the AMF forwards the N2 Session Management information and the user location information received from the NG-RAN to the SMF via a Nsmf_PDUSession_UpdateSMContext service operation. The SMF replies with a Nsmf_PDUSession_UpdateSMContext Response as indicated in TS 23.502 in clause 4.3.3.2

At operation 19 of FIG. 11, the SMF may update a N4 session of the UPF(s) that are involved by the PDU Session Modification by sending N4 Session Modification Request message to the UPF. The UPF may respond accordingly.

At operation 20 of FIG. 11, if the SMF interacted with the PCF previously, the SMF may notify the PCF whether the PCC decision could be enforced or not by performing an SMF initiated SM Policy Association Modification procedure as defined in TS 23.502 in clause 4.16.5.1.

In some embodiments, a network-initiated (e.g., by an Application Function (AF)) reservation of additional bandwidth as a function of 6DoF errors may be performed (e.g., based on Rel. 16 TS 23.502 or on any upcoming session modification procedure). In this regard, the QoS Indicators may be initially allocated using the procedures described in FIG. 10A, (e.g., as described in TS 23.502, or any other similar procedure). Then, the QoS Indicator may be modified considering the update request from the network side.

In this regard, in some embodiments, the AF may influence the UE, such as by transmitting AF requests that target a particular UE by a UE address. These AF requests may be routed (e.g., by the AF or by the Network Exposure Function (NEF)) to an individual PCF using the Binding Support Function (BSF). In other embodiments, the AF requests (e.g., described in clause 5.6.7 of TS 23.501) may target a group of UEs, or any UE accessing a combination of a Data Network Name (DNN) and Single-Network Slice Selection Assistance Information (S-NSSAI), or target an individual UE by a General Public Subscription Identifier (GPSI).

AF requests targeting an individual UE by a UE address are handled are shown in an example representation in FIG. 12. Depending on the AF deployment (e.g., as described in TS 23.501 [2], clause 6.2.10), the AF may cause transmission of the AF request to the PCF directly, in which case operation 1 may not be performed, or via the NEF.

At operation 1 of FIG. 12, if the AF causes transmission of the AF request via the NEF, the AF transmits a Nnef_TrafficInfluenceCreate/Update/Delete Request targeting an individual UE address to the NEF. This request corresponds to an AF request to influence traffic routing that targets an individual UE address that has a specific 6DoF Error. Necessary authorization control and mapping from the information provided by the AF into information needed by the 5GC is ensured by the NEF.

At operation 2 of FIG. 12, the AF/NEF consumes a Nbsf_Management_Discovery service operation (providing at least the UE address) to determine the address of the relevant PCF. In some embodiments, if the PCF address is available on the NEF based on local configuration, this operation may not be performed.

At operation 3 of FIG. 12, the BSF provides the PCF address in a Nbsf_Management_Discovery Response to AF/NEF. At operation 4 of FIG. 12, if operation 1 was performed, the NEF invokes the Npcf_PolicyAuthorization service to the PCF to transfer the AF request. If an AF sends the AF request directly to the PCF, AF invokes the Npcf_PolicyAuthorization service and the PCF responds to the AF. The Npcf_PolicyAuthorization service comprises the specific 6DoF Error. At operation 5 of FIG. 12, the PCF updates the SMF with corresponding new PCC rule(s) with PCF initiated SM Policy Association Modification procedure (e.g., as described in clause 4.3.6.4 of TS 23.502).

In some embodiments, if the UE address is not known, the operations detailed in FIG. 13 may be performed. At operation 1 of FIG. 13, the AF creates a new request for Nnef_TrafficInfluence_Create service operation with the 6DoF Error. At operation 2 of FIG. 13, the AF causes transmission of the request comprising the 6DoF Error to the NEF. Alternatively, if the request is sent directly from the AF to the PCF, the AF reaches the PCF selected for the existing PDU Session by configuration or by invoking Nbsf_management_Discovery service (similarly to FIG. 12).

At operation 3 of FIG. 13, the NEF stores the AF request information in the UDR (wherein the Data Set comprises Application Data, the Data Subset comprises AF traffic influence request information, and the Data Key comprises the AF Transaction Internal ID, S-NSSAI and DNN and/or Internal Group Identifier or SUPI).

At operation 4 of FIG. 13, the NEF may cause transmission of a response to the AF. At operation 5 of FIG. 13, PCF(s) that have subscribed to modifications of AF receive(s) a Nudr_DM_Notify notification of a data change from the UDR requests.

At operation 6 of FIG. 13, the PCF may determine if existing PDU Sessions are potentially impacted by the AF request. For each of these PDU Sessions, the PCF updates the SMF with corresponding new PCC rule(s) (e.g., as described in clause 4.3.6.4 of TS 23.502).

At operation 7 of FIG. 13, the SMF may perform actions to reconfigure the user plane of the PDU Session. This procedure is described in 4.3.3.2 of TS 23.502 and requires the addition of the execution of the computation of the eQoS indicator using for example the method described in reference to FIG. 6. In embodiments wherein AF-initiated reservation of additional bandwidth as a function of 6DoF errors is performed, the Information element contained in an AF request may be enhanced with the 6DoF error. The field may be optional.

Numerical Results

FIGS. 14A-14E provide results that show the relationship between the 6DoF error and the amount of extra information that needs to be sent to the UE in order to compensate this error. The results show that the 6DoF error highly affects the amount of information to be sent to the UE and the bitrate of XR services. Therefore, the knowledge of the 6DoF error as a QoS parameter/characteristic helps the network to improve resource management decisions.

To evaluate, an FoV is modeled as a pyramid with an octagonal base (approximation of the semi-cone) and the 6DoF error using two parameters, e (a maximum relative positioning error expressed as percentage of the radius of the semi-cone representing the FoV which provides a bound for the maximum horizontal and vertical displacements of the FoV apex) and ε, a maximum angle of rotation on each axis of the FoV expressed in degrees.

The algorithm disclosed above in reference to FIG. 6 is used to compute the volume of the convex hull $V_P$ obtained by considering all displacements and rotations according to e and ε. Finally, the information ratio is measured as the ratio between the volumes of the original FoV and the convex hull $V_P$. The information ratio, also referred to as additional bandwidth in FIG. 6, corresponds to the worst-case bandwidth that needs to be reserved to transmit the extra information needed to compensate the 6DoF error.

In various simulations performed, the maximum distance e is varied from 5% to 30% of the FoV radius and the maximum rotation angle ε is varied from 5 to 30 degrees. The angle of view is set to 90 degrees according to the head-mounted device (Oculus Quest 2). It should be noted that the 180-degrees view can be obtained considering the combination of two FoVs captured by two cameras. However, the information ratio can be computed considering only one camera.

The two cones 40 illustrated in FIGS. 14A and 14B show two possible displacements and rotations of the actual FoV (cone 42) when e=10% and ε=30°. By considering all possible displacements at maximum distance e from the FoV apex and all possible rotations around the x- and y-axis (the semi-cone is invariant to the rotation on the z-axis) we get the convex hull with volume $V_P$ illustrated in FIG. 14C and FIG. 14D. While the radius of the original FoV in green in FIG. 14B is equal to 1, the convex hull in FIG. 14D has a radius equal to 1.5.

Results of the information ratio as a function of the relative positioning error e and the angle of rotation E are illustrated in FIG. 14E Error! Reference source not found. Each curve represents the information ratio (or guaranteed bandwidth) for a fixed maximum angle of rotation when the maximum relative positioning error varies between 5% to 30% of the FOV's radius. It can be observed that even small position and rotation errors result in a high information ratio. For example, with position and rotation errors as low as 5% of the radius and 5°, the network should expect a bitrate for the XR connection twice as large as the bitrate of the connection without the error.

The results show the benefit of utilizing the 6DoF error, as it enables a more accurate reservation and scheduling of network and radio resources. Note that additional information can be considered in order to improve eQoS parameters like the guaranteed bandwidth. For example, the direction where the user is moving can be used to consider positioning errors only in the direction of the user movements, thus reducing the guaranteed bandwidth by half.

FIGS. 10A-C, 11, 12, and 13 illustrate flowcharts depicting methods according to an example embodiment of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 54 of an apparatus employing an embodiment of the present invention and executed by a processor 52. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowchart, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   receiving, by an apparatus, a positioning error set;
   determining, an enhanced quality of service (QOS) indicator representing a QoS for a client device associated with the positioning error set,
   wherein the determining the enhanced QoS indicator comprises determining the following: a bandwidth, a guaranteed bit rate (GBR), a maximum bit rate (MBR), and one or more QoS characteristics for the client device based at least on the positioning error set, and
   wherein the determining the enhanced QoS comprises:
   determining a maximum displacement value and an angle of rotation value based at least on the positioning error set;
   applying a transformation to the maximum displacement value and the angle of rotation value to determine a first field of view representation;
   generating a point list by applying a plurality of displacements to a second field of view representation;
   select extreme points and add to the point list by displacing and rotating the second field of view representation;
   based at least on the point list, determining a volume of a convex hull of points in the point list;
   determining an information ratio based at least on a volume of the first field of view representation and the volume of the convex hull; and
   determining a guaranteed bitrate based at least on the information ratio; and transmitting configuration data related to a QoS flow for the client device, the configuration data being obtained based at least on the enhanced QoS indicator,
wherein the configuration data related to the QoS flow comprises one or more QoS rules and one or more QoS parameters for the QoS flow.

2. The method of claim 1, wherein the positioning error set is received from the client device or a network function associated with the client device.

3. The method stem of claim 2, wherein the receiving comprises receiving a Packet Data Unit (PDU) session create request including the positioning error set and wherein the transmitting comprises transmitting a PDU session create response to the PDU session create request, the PDU session create response comprising the configuration data related to the QoS flow for the client device.

4. The method of claim 2, wherein the receiving comprises receiving a Packet Data Unit (PDU) session update request and wherein the transmitting comprising transmitting a PDU session update response comprising the configuration data related to the QoS flow for the client device.

5. A system comprising:
an apparatus;
at least one processor; and
at least one memory including computer program code, wherein the computer program code, when executed by the at least one processor, causes the apparatus to at least:
receiving a positioning error set;
determining, an enhanced quality of service (QOS) indicator representing a QoS for a client device associated with the positioning error set,
wherein the determining the enhanced QoS indicator comprises determining the following: a bandwidth, a guaranteed bit rate (GBR), a maximum bit rate (MBR), and one or more QoS characteristics for the client device based at least on the positioning error set, and
wherein the determining the enhanced QoS comprises:
determining a maximum displacement value and an angle of rotation value based at least on the positioning error set;
applying a transformation to the maximum displacement value and the angle of rotation value to determine a first field of view representation;
generating a point list by applying a plurality of displacements to a second field of view representation;
select extreme points and add to the point list by displacing and rotating the second field of view representation;
based at least on the point list, determining a volume of a convex hull of points in the point list;
determining an information ratio based at least on a volume of the first field of view representation and the volume of the convex hull; and
determining a guaranteed bitrate based at least on the information ratio; and
transmitting configuration data related to a QoS flow for the client device, the configuration data being obtained based at least on the enhanced QoS indicator,
wherein the configuration data related to the QoS flow comprises one or more QoS rules and one or more QoS parameters for the QoS flow.

6. The system of claim 5, wherein the positioning error set is received from the client device or a network function associated with the client device.

7. The system of claim 6, wherein the receiving comprises receiving a Packet Data Unit (PDU) session create request including the positioning error set and wherein the transmitting comprises transmitting a PDU session create response to the PDU session create request, the PDU session create response comprising the configuration data related to the QoS flow for the client device.

8. The system of claim 6, wherein the receiving comprises receiving a Packet Data Unit (PDU) session update request and wherein the transmitting comprising transmitting a PDU session update response comprising the configuration data related to the QoS flow for the client device.

9. An apparatus comprising:
at least one processor; and
at least one memory including computer program code, wherein the computer program code, when executed by the at least one processor, causes the apparatus to at least:
receiving a positioning error set;
determining, an enhanced quality of service (QOS) indicator representing a QoS for a client device associated with the positioning error set,
wherein the determining the enhanced QoS indicator comprises determining the following: a bandwidth, a guaranteed bit rate (GBR), a maximum bit rate (MBR), and one or more QoS characteristics for the client device based at least on the positioning error set, and
wherein the determining the enhanced QoS comprises:
determining a maximum displacement value and an angle of rotation value based at least on the positioning error set;
applying a transformation to the maximum displacement value and the angle of rotation value to determine a first field of view representation;
generating a point list by applying a plurality of displacements to a second field of view representation;
select extreme points and add to the point list by displacing and rotating the second field of view representation;
based at least on the point list, determining a volume of a convex hull of points in the point list;
determining an information ratio based at least on a volume of the first field of view representation and the volume of the convex hull; and
determining a guaranteed bitrate based at least on the information ratio; and
transmitting configuration data related to a QoS flow for the client device, the configuration data being obtained based at least on the enhanced QoS indicator,
wherein the configuration data related to the QoS flow comprises one or more QoS rules and one or more QoS parameters for the QoS flow.

10. The apparatus of claim 9, wherein the positioning error set is received from the client device or a network function associated with the client device.

11. The apparatus of claim 9, wherein the receiving comprises receiving a Packet Data Unit (PDU) session create request including the positioning error set and wherein the transmitting comprises transmitting a PDU session create response to the PDU session create request, the PDU session create response comprising the configuration data related to the QoS flow for the client device.

12. The apparatus of claim 9, wherein the receiving comprises receiving a Packet Data Unit (PDU) session update request and wherein the transmitting comprising transmitting a PDU session update response comprising the configuration data related to the QoS flow for the client device.

\* \* \* \* \*